United States Patent
Mukunoki et al.

(10) Patent No.: US 10,826,378 B2
(45) Date of Patent: Nov. 3, 2020

(54) POWER CONVERSION APPARATUS FOR INTERCONNECTION WITH A THREE-PHRASE AC POWER SUPPLY

(71) Applicants: Mitsubishi Electric Corporation, Chiyoda-ku (JP); TOSHIBA MITSUBISHI-ELECTRIC INDUSTRIAL SYSTEMS CORPORATION, Chuo-ku (JP)

(72) Inventors: Kaho Mukunoki, Chiyoda-ku (JP); Toshiyuki Fujii, Chiyoda-ku (JP); Ryosuke Uda, Chiyoda-ku (JP); Taichiro Tsuchiya, Chuo-ku (JP); Hisanori Taguchi, Chuo-ku (JP); Ryota Okuyama, Chuo-ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/610,764

(22) PCT Filed: May 17, 2017

(86) PCT No.: PCT/JP2017/018521
§ 371 (c)(1),
(2) Date: Nov. 4, 2019

(87) PCT Pub. No.: WO2018/211624
PCT Pub. Date: Nov. 22, 2018

(65) Prior Publication Data
US 2020/0161960 A1    May 21, 2020

(51) Int. Cl.
*H02M 1/12* (2006.01)
*H02M 7/483* (2007.01)

(52) U.S. Cl.
CPC ............. *H02M 1/12* (2013.01); *H02M 7/483* (2013.01); *H02M 2007/4835* (2013.01)

(58) Field of Classification Search
CPC .. H02M 1/12; H02M 7/483; H02M 2001/325; H02J 3/18; H02J 3/26; G05F 1/70
See application file for complete search history.

(56) References Cited

U.S. PATENT DOCUMENTS 6,301,130 B1 * 10/2001 Aiello ..................... H02M 7/49
                                                          363/37
8,259,480 B2    9/2012 Hasler
(Continued)

FOREIGN PATENT DOCUMENTS

EP          3093977 A1     11/2016
JP        2014-57488 A      3/2014
(Continued)

OTHER PUBLICATIONS

International Search Report dated Jun. 20, 2017 in PCT/JP2017/018521 filed May 17, 2017.
(Continued)

*Primary Examiner* — Emily P Pham
(74) *Attorney, Agent, or Firm* — Oblon, McClelland, Maier & Neustadt, L.L.P.

(57) ABSTRACT

A control device generates a voltage command value for controlling a current flowing between a three-phase AC power supply and a power converter such that a full voltage representative value representing voltage values of all power storage devices agrees with a DC voltage command value. The control device generates a zero-phase voltage command value for controlling a circulating current flowing in a delta connection such that the voltage values of the power storage devices are balanced among first to third arms. The control device combines the voltage command value and the zero-phase current command value to generate an output voltage (Continued)

command value for controlling an output voltage of each unit converter. The control device removes a control amount of the full voltage representative value from a computation of the zero-phase voltage command value to cause output current control and circulating current control not to interfere with each other.

10 Claims, 15 Drawing Sheets

(56) References Cited

U.S. PATENT DOCUMENTS

| | | | |
|---|---|---|---|
| 2014/0078796 A1 | 3/2014 | Inoue et al. | |
| 2014/0103887 A1 | 4/2014 | Akagi et al. | |
| 2014/0218986 A1* | 8/2014 | Hasler | H02P 27/14 363/123 |
| 2014/0369096 A1* | 12/2014 | Hosokawa | H02M 7/49 363/68 |
| 2015/0236611 A1* | 8/2015 | Nakazawa | H02M 1/36 363/123 |

FOREIGN PATENT DOCUMENTS

| | | |
|---|---|---|
| JP | 2015-108967 A | 6/2015 |
| WO | WO 2012/099176 A1 | 7/2012 |
| WO | WO 2015/141681 A1 | 9/2015 |

OTHER PUBLICATIONS

Extended European Search Report dated Apr. 29, 2020 in European Application No. 17910396.5.

* cited by examiner

POWER CONVERSION APPARATUS FOR INTERCONNECTION WITH A THREE-PHRASE AC POWER SUPPLY

TECHNICAL FIELD

The present invention relates to power conversion apparatuses, and more particularly, to a power conversion apparatus including a modular multilevel converter.

BACKGROUND ART

A large power conversion apparatus, in which a converter outputs high voltage or large current, is frequently formed of a plurality of converters connected in series or in parallel by multiple connection. It is known that multiple connection of converters not only increases the capacities of the converters but also reduce harmonics included in an output voltage waveform by combining outputs, thus reducing a harmonic current flowing out of the conversion apparatus.

The methods for multiple connection of converters include various methods such as multiple connection of reactors, multiple connection of transformers, and direct multiple connection. Multiple connection of transformers insulates the AC side by transformers, so that a direct current is advantageously made common in the converters. However, at higher output voltage, the configuration of multiple connected transformers may be complicated, and the cost of transformers may increase (e.g., WO 2012/99176 (PTL 1)).

Under the circumstances, a multilevel converter in which the outputs of a plurality of converters are cascade-connected is proposed as a power conversion apparatus which requires no multiple connected transformers and is suitable for high-voltage use. One example of such a multilevel converter is a modular multilevel converter (hereinafter referred to as MMC). The MMC is a converter interconnectable with a power system because it can have higher breakdown voltage and higher capacity, and finds wide applications in, for example, high-voltage direct current (HVDC), back to back (BTB) (asynchronous interconnection apparatus), frequency changer (FC), static synchronous compensator (STATCOM).

The MMC is formed of arms including a plurality of unit converters, referred to as cells, which are cascade-connected. The cell includes a plurality of semiconductor switches and a DC capacitor, and outputs a voltage across the DC capacitor or zero voltage by turning on and off the semiconductor switches.

A three-phase MMC can have various configurations depending on a method of connecting arms, and one of such configurations is a configuration of delta-connected cascade type. A three-phase MMC of delta-connected cascade type (hereinafter also referred to as "delta-connected MMC") has a configuration in which a plurality of cells are cascade-connected, and further, arms including series-connected reactors are delta-connected. The delta-connected MMC is connected in parallel with an AC power system via a reactor or transformer. There are thus two current components of a current flowing between phases from a system and a current which is not output to the system side and circulates in the delta connection. The delta-connected MMC accordingly needs to control these current components. Also, a DC capacitor is configured in each cell, and the DC capacitor includes no power supply, and accordingly, needs to control its voltage within a certain range.

The delta-connected MMC is characterized by including a path for circulation in the delta connection as described above. Specifically, the current flowing through each arm has an output current component output to a system and a circulation current component circulating within the delta connection. The delta-connected MMC thus controls these two current components.

Further, since the delta-connected MMC has a DC capacitor in each cell, the voltage across the DC capacitor among phases may experience an imbalance due to variations in the voltage among the DC capacitors. This requires control of the voltage across the DC capacitor for reducing such an imbalance.

A conventional MMC has a configuration including control means for performing control such that an average value of the voltages across the DC capacitors in each phase follows an average value of the voltages across all the DC capacitors and control means for performing control such that an average value of the voltages of the DC capacitors in each phase follows an average value of the voltages across all the DC capacitors, as described in, for example, PTL 1 and U.S. Pat. No. 8,259,480 (PTL 2).

CITATION LIST

Patent Literature

PTL 1: WO 2012/99176
PTL 2: U.S. Pat. No. 8,259,480

SUMMARY OF INVENTION

Technical Problem

In the delta-connected MMCs described in PTLs 1 and 2, however, the control means for controlling an average value of the voltages across all the DC capacitors may interfere with the control means for controlling an average value of the voltages across DC capacitors in each phase during transient fluctuations in which all the DC capacitors are charged and discharged. The interference between the two control means may deteriorate the control performance of the delta-connected MMC, resulting in an unstable operation of the delta-connected MMC.

The present invention has been made to solve the above problem, and has an object to enable a stable operation of a three-phase MMC of delta-connected cascade type also during transient fluctuations in a power conversion apparatus including the three-phase MMC.

Solution to Problem

A power conversion apparatus according to the present disclosure is a power conversion apparatus for interconnection with a three-phase AC power supply. The power conversion apparatus includes a power converter having first to third arms connected by delta connection, and a control device configured to control the power converter. Each of the first to third arms includes one unit converter or a plurality of unit converters connected in series. The unit converter includes a power storage device connected between a pair of output terminals, and a plurality of switching devices configured to generate, between the pair of output terminals, an output pulse dependent on a voltage value of the power storage device. The control device includes a first control unit, a second control unit, a computation unit, and a generation unit. The first control unit is configured to generate a voltage command value for controlling a current flowing between the three-phase AC power supply and the power converter such that a full voltage representative value representing voltage values of all the power storage devices agrees with a DC voltage command value. The second control unit is configured to generate a zero-phase voltage command value for controlling a circulating current flowing through the delta connection such that the voltage values of the power storage devices in each arm are balanced among the first to third arms. The computation unit is configured to combine the voltage command value generated by the first control unit and the zero-phase voltage command value generated by the second control unit to generate an output voltage command value for controlling an output voltage of each of the unit converters. The generation unit is configured to generate a gate signal for controlling switching operations of the plurality of switching devices in accordance with the output voltage command value. The control device is configured to remove a control amount of the full voltage representative value from a computation of the zero-phase voltage command value in the second control unit to cause the first control unit and the second control unit not to interfere with each other.

Advantageous Effects of Invention

The present disclosure enables a stable operation of a three-phase MMC of delta-connected cascade type also during transient fluctuations in a power conversion apparatus including the three-phase MMC.

DESCRIPTION OF EMBODIMENTS

Figure 1:
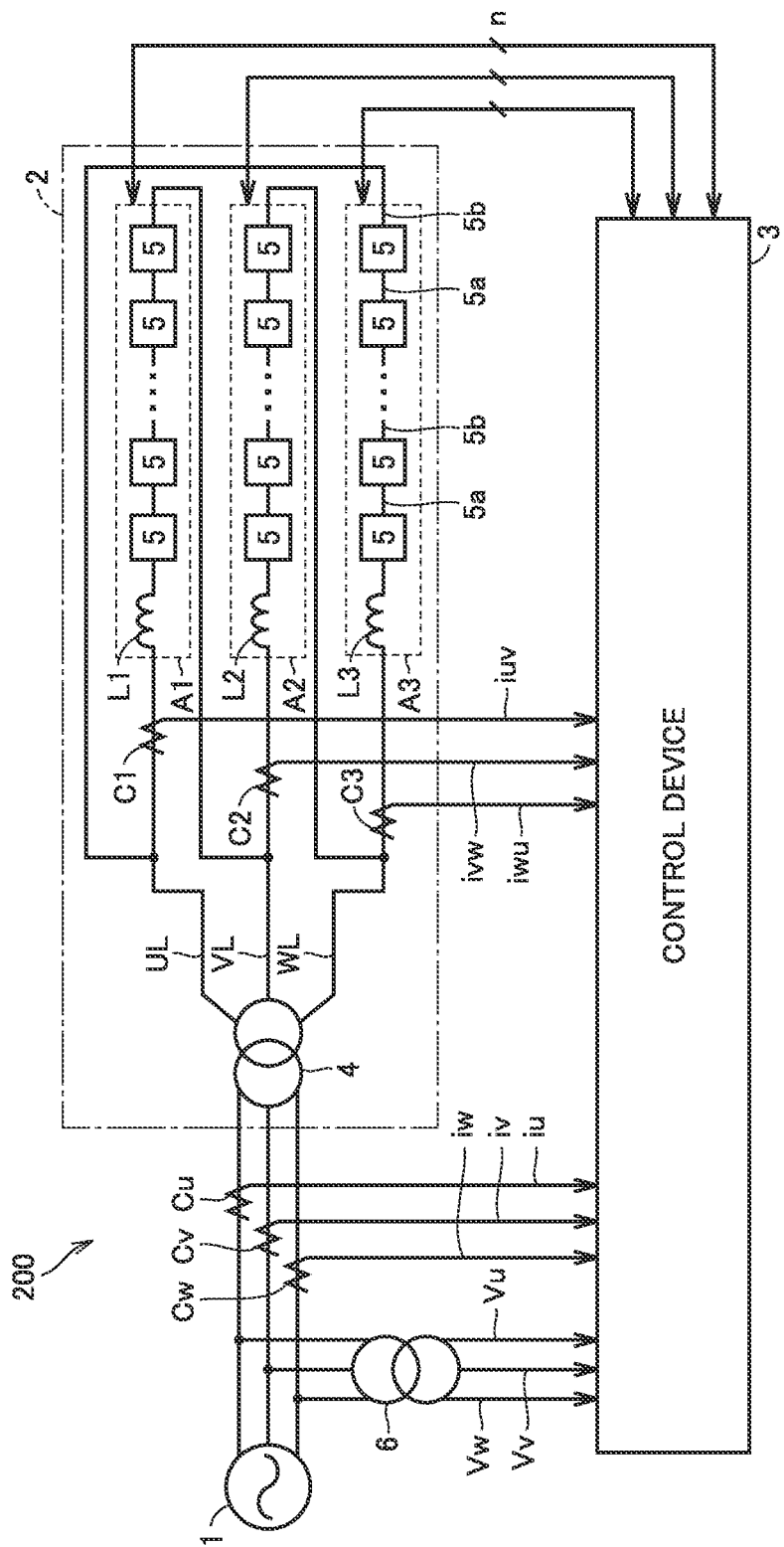
FIG. 1 is a circuit block diagram showing a configuration of a power conversion apparatus according to Embodiment 1 of the present invention.

Embodiments of the present invention will be described below in detail with reference to the drawings. The same or corresponding elements in the drawings have the same reference characters allotted, and description thereof will not be repeated.

Embodiment 1

FIG. 1 is a circuit block diagram showing a configuration of a power conversion apparatus according to Embodiment 1 of the present invention. In FIG. 1, a power conversion apparatus 200 is used as a reactive power compensator that compensates for the reactive power of a power system 1.

With reference to FIG. 1, power conversion apparatus 200 includes a modular multilevel converter (hereinafter referred to as MMC) 2 and a control device 3 that controls MMC 2.

MMC 2 includes a transformer 4 and AC lines UL, VL, and WL of three phases (U, V, W phases). Transformer 4 includes three primary windings and three secondary windings. Each of the three primary windings is connected to a corresponding one of power transmission lines $1u$, $1v$, and $1w$ of the three phases of power system 1. Each of the three secondary windings is connected to a corresponding one of first terminals of AC lines UL, VL, and WL.

MMC 2 is configured to feed or absorb reactive power to and from power system 1 through transformer 4. Specifically, when the three-phase AC voltage (hereinafter also referred to as "system voltage") of power system 1 decreases, MMC 2 feeds reactive power to power system 1 so as to increase the system voltage. Contrastingly, when the system voltage increases, MMC 2 absorbs reactive power from power system 1 so as to reduce the system voltage. MMC 2 can feed or absorb a current orthogonal to the system voltage to and from power system 1, thereby compensating for the reactive power.

In the ideal state of power conversion apparatus 200, thus, the active power accommodated from power system 1 to MMC 2 is sufficiently smaller than the reactive power. Herein, the ideal state includes the case in which a power loss inside MMC 2 (unit converter 5) is approximately zero and the case in which the system voltage is in the three-phase equilibrium state.

MMC 2 corresponds to one embodiment of "power converter" in the present invention. Although MMC 2 is connected to power system 1 through transformer 4 in FIG. 1, MMC 2 may be connected to power system 1 through an interconnection reactor.

MMC 2 further includes arms A1 to A3. Arm A1 is connected between a second terminal of AC line UL and a second terminal of AC line VL. Arm A2 is connected between the second terminal of AC line VL and a second terminal of AC line WL. Arm A3 is connected between the second terminal of AC line WL and the second terminal of AC line UL. In other words, arms A1 to A3 are connected by delta connection.

Each of arms A1 to A3 includes a plurality of unit converters 5 (hereinafter, merely referred to as "cells" as well) connected in series. Each of cells 5 performs bidirectional power conversion in accordance with a control signal from control device 3. In the example of FIG. 1, n (n is an integer not less than two) cells 5 are connected in series in each of arms A1 to A3. In other words, MMC 2 includes 3n cells 5 in total.

Arm A1 further includes a reactor L1 connected in series with cells 5. Arm A2 further includes a reactor L2 connected in series with cells 5. Arm A3 further includes a reactor L3 connected in series with cells 5. Each of reactors L1 to L3 is disposed to reduce a circulating current flowing through the delta connection. The position of each of reactors L1 to L3 is not limited to the position shown in FIG. 1 as long as each reactor is connected in series with cells 5 of a corresponding arm. Alternatively, a plurality of reactors L1 to L3 may be distributed within a corresponding one of A1 to A3, respectively.

A configuration example of cell 5 shown in FIG. 1 will now be described with reference to FIGS. 2 and 3.

Figure 2:
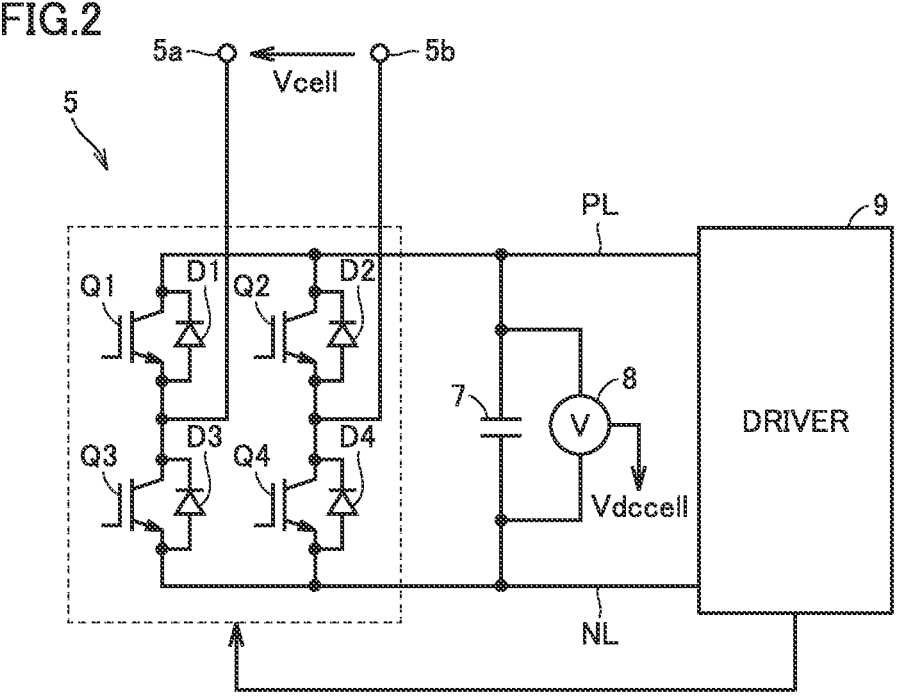
FIG. 2 illustrates a first configuration example of a cell 5 shown in FIG. 1.

With reference to FIG. 2, cell 5 according to a first configuration example has a so-called full-bridge configuration. Specifically, cell 5 includes output terminals 5a and 5b, switching devices Q1 to Q4, diodes D1 to D4, a capacitor 7, a voltage detector 8, and a driver 9.

Switching devices Q1 to Q4 are self-turn-off power semiconductor elements and are formed of, for example, insulated gate bipolar transistors (IGBTs). Switching devices Q1 and Q3 are connected in series between a pair of power lines (a positive line PL and a negative line NL). Switching devices Q2 and Q4 are connected in series between the pair of power lines. Both the collectors of switching devices Q1 and Q2 are connected to positive line PL, and both the emitters of switching devices Q3 and Q4 are connected to negative line NL. The connection point between the emitter of switching device Q1 and the collector of switching device Q3 is connected to output terminal 5a. The connection point between the emitter of switching device Q2 and the collector of switching device Q4 is connected to output terminal 5b. Diodes D1 to D4 are connected in antiparallel with switching devices Q1 to Q4, respectively.

Capacitor 7 is connected between positive line PL and negative line NL and stores DC power. Voltage detector 8 detects a DC voltage between terminals of capacitor 7 (hereinafter, merely referred to as "capacitor voltage Vdccell" as well) and outputs a signal indicating the detected capacitor voltage Vdccell to control device 3.

Driver 9 is connected to positive line PL and negative line NL and is driven by the DC power stored in capacitor 7. Driver 9 controls on and off (switching operation) of switching devices Q1 to Q4 based on a gate signal from control device 3. Cell 5 can switch an output voltage Vcell between output terminals 5a and 5b among +Vdccell, 0, −Vdccell in accordance with the switching operations of switching devices Q1 to Q4. Although capacitor 7 is a power supply for driving driver 9 in the example of FIG. 2, driver 9 may be driven by another power supply (e.g., another power supply line or a separate power supply).

Figure 3:
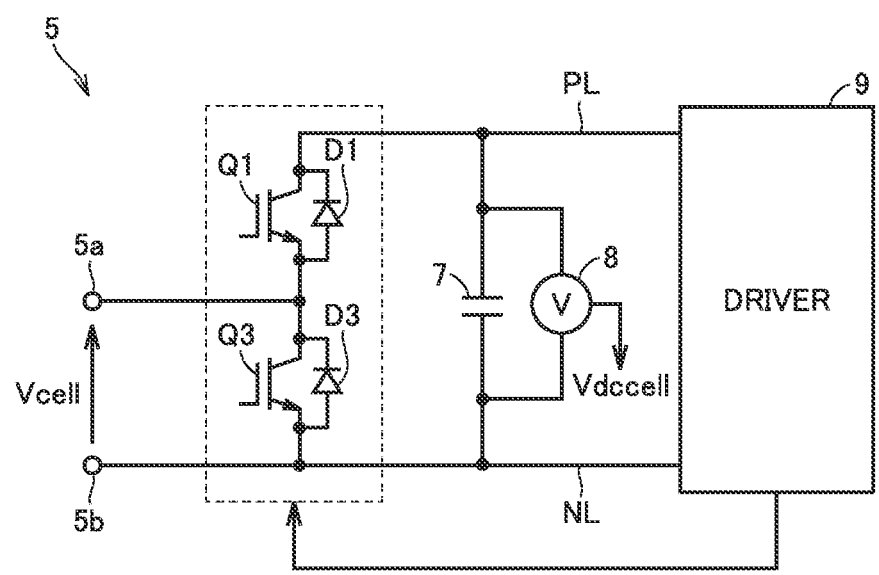
FIG. 3 illustrates a second configuration example of cell 5 shown in FIG. 1.

With reference to FIG. 3, cell 5 according to a second configuration example has a so-called half-bridge configuration. Specifically, cell 5 includes output terminals 5a and 5b, switching devices Q1 and Q3, diodes D1 and D3, capacitor 7, voltage detector 8, and driver 9.

Switching device Q1 is connected between positive line PL and output terminal 5a. Switching device Q2 is connected between output terminals 5a and 5b. Diodes D1 and D3 are connected in anti-parallel with switching devices Q1 and Q3, respectively.

Capacitor 7 is connected between output terminals 5a and 5b via switching device Q1. Driver 9 controls the switching operations of switching devices Q1 and Q3 based on a gate signal from control device 3. Cell 5 can set output voltage Vcell between output terminals 5a and 5b to +Vdccell or 0 in accordance with the switching operations of switching devices Q1 and Q2.

The configuration of cell 5 shown in FIG. 1 is not limited to the configuration examples shown in FIGS. 2 and 3 as long as cell 5 is configured of a series circuit of a plurality of (e.g., two) switching devices and a capacitor connected in series with the series circuit and selectively outputs capacitor voltage Vdccell between output terminals 5a and 5b in accordance with the switching operations of the plurality of switching devices.

Although a semiconductor switching device is used as a switching device in cell 5 in the present embodiment, another switching device (e.g., mechanical switch) may be used in place of the semiconductor switching device as long as it allows the passage and interruption of a current through control of one and off of the switching device by driver 9.

In cell 5, capacitor 7 corresponds to one embodiment of "power storage device". Capacitor voltage Vdccell detected by voltage detector 8 corresponds to "the voltage across the power storage device".

As shown in FIG. 1, output terminals 5a of cells 5 at the first stage are connected to the second terminals of AC lines UL, VL, and WL through reactors L1 to L3 in arms A1 to A3, respectively. Output terminals 5b of cells 5 at the last stage of arms A1 to A3 are connected to the second terminals of AC lines VL, WL, and UL, respectively. In each arm, output terminals 5a of cells 5 except for ones at the first stage and the last stage are connected to output terminals 5b of cells 5 at the former stages, and output terminals 5b thereof are connected to output terminals 5a of cells 5 at the following stages.

Referring back to FIG. 1, current detectors Cu, Cv, and Cw for detecting currents iu, iv, and iw (hereinafter referred to as "output currents") flowing between power system 1 and MMC 2 are disposed in power transmission lines 1u, 1v, and 1w of three phases of power system 1, respectively. Further, a voltage detector 6 for detecting three-phase AC voltages Vu, Vv, and Vw (also referred to as "system voltages") of power system 1 is disposed in power transmission lines 1u, 1v, and 1w.

Further, a current detector C1 for detecting a current flowing through arm A1 (hereinafter referred to as "arm current iuv") is disposed in AC line UL. A current detector C2 for detecting a current flowing through arm A2 (hereinafter referred to as "arm current ivw") is disposed in AC line VL. A current detector C3 for detecting a current flowing through arm A3 (hereinafter referred to as "arm current iwu") is disposed in AC line WL.

Output currents iu, iv, and iw can be computed based on the detection values of arm currents iuv, ivw, and iwu by current detectors C1 to C3 without the use of current detectors Cu, Cv, and Cw. Iu equals Iuv-Iwu, Iv equals Ivw-Iuv, and Iw equals Iwu-Ivw.

The values detected by current detectors Cu, Cv, Cw, and C1 to C3, and voltage detector 6 are input to control device 3. Control device 3 controls the operation of each of arms A1 to A3 (i.e., each of 3n cells 5) using a command from a higher-order controller (not shown), a detection signal input from each detector, and the like.

Control device 3 can be configured of, for example, a microcomputer. In one example, control device 3 has a built-in memory (not shown) and a built-in control processing unit (CPU, not shown) and can execute a control operation, which will be described below, through software processing by the CPU executing a program stored preliminarily in the memory. Alternatively, a part or the entire of the control operation can be realized by hardware processing using, for example, a built-in dedicated electronic circuit in place of software processing.

A control configuration of MMC 2 by control device 3 will now be described with reference to FIG. 4. The function of each block shown in FIG. 4 can be realized through software processing and/or hardware processing by control device 3.

Figure 4:
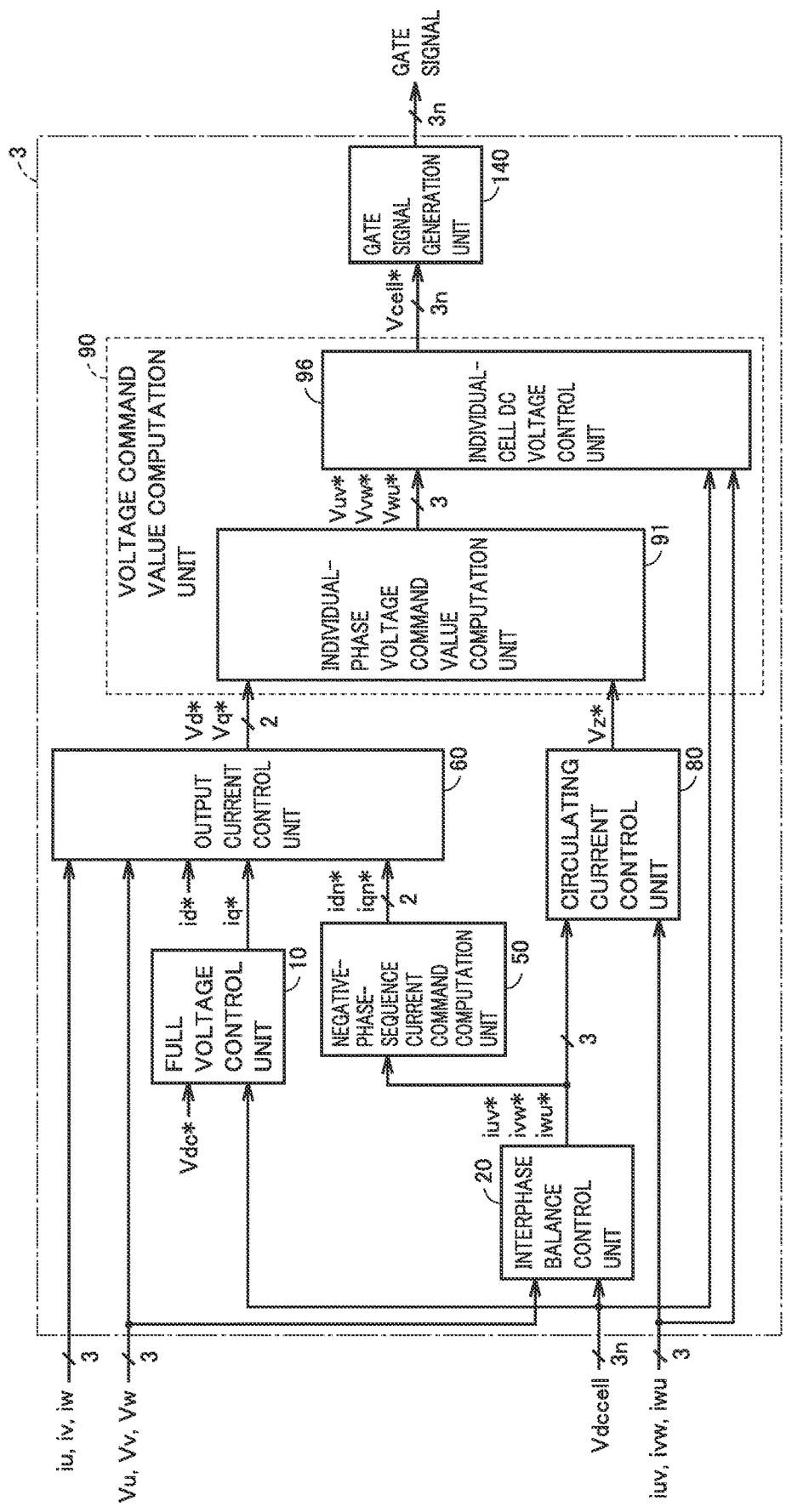
FIG. 4 is a block diagram illustrating a control configuration of an MMC by a control device 3.

With reference to FIG. 4, control device 3 includes an output current control unit 60, a circulating current control unit 80, a voltage command value computation unit 90, and a gate signal generation unit 140.

Output current control unit 60 is configured to control output currents iu, iv, and iw of MMC 2 to control active power transmitted and received between power system 1 and MMC 2 and reactive power output from MMC 2 to power system 1. Output current control unit 60 controls the active power transmitted and received between power system 1 and MMC 2 to cause a representative value Vdc of voltage values Vdccell of all capacitors 7 included in MMC 2 to follow a DC voltage command value Vdc*. DC voltage command value Vdc* may be input from a higher-order controller (not shown) or may be predetermined in control device 3. Output current control unit 60 controls the reactive power output from MMC 2 to power system 1 to stabilize the system voltage.

An active current command value iq* used in active current control is computed by full voltage control unit 10. A reactive current command value id* used in reactive current control is computed from, for example, a positive-phase-sequence voltage of power system 1. Reactive current command value id* may be input from the higher-order controller or may be predetermined in control device 3.

Specifically, output current control unit 60 performs a control computation for causing a reactive current id and an active current iq, which are obtained by three-phase to dq transformation of output currents iu, iv, and iw of MMC 2, to follow output current command values idpn* and iqpn*, which are generated by combining positive-phase-sequence current command values id* and iq* and negative-phase-sequence current command values idn* and iqn*, respectively, thereby generating voltage command values Vd* and Vq*. Voltage command values Vd* and Vq* are composed of a voltage component Vd* in phase with the reactive current and voltage component Vq* in phase with the active current, respectively.

Circulating current control unit 80 controls a circulating current iz flowing through the delta connection to balance voltage values Vdccell of capacitors 7 among phases in MMC 2. Circulating current control unit 80 balances the representative value of voltage values Vdccell of one or more capacitors 7 included in each of first to third arms A1 to A3 using circulating current iz. Specifically, circulating current control unit 80 performs a control computation for causing circulating current iz to follow a circulating current command value iz* generated by interphase balance control unit 20 to generate a zero-phase voltage command value Vz*.

Voltage command value computation unit 90 performs dq to three-phase transformation on voltage command values Vd* and Vq* generated by output current control unit 60 to return voltage command values Vd* and Vq* to voltage command values of three phases. Voltage command value computation unit 90 adds zero-phase voltage command value Vz* to each of the voltage command values of three phases, thereby generating arm voltage command values Vuv*, Vvw*, and Vwu*.

Voltage command value computation unit 90 further generates an output voltage command value Vcell* for controlling output voltage Vcell of each cell 5 based on arm voltage command values Vuv*, Vvw*, and Vwu*, capacitor voltage Vdccell of each cell 5, and arm currents iuv, ivw, and iwu. In the present embodiment, 3n output voltage command values Vcell* are generated correspondingly to 3n cells 5.

Gate signal generation unit 140 generates a gate signal to be provided to each of 3n cells 5 from 3n output voltage command values Vcell*.

In summary, control device 3 charges and discharges capacitors 7 to cause representative value Vdc of voltage values Vdccell of all capacitors 7 to follow DC voltage command value Vdc*, and performs output current control of controlling output currents iu, iv, and iw for outputting desired reactive power to power system 1 and circulating current control of controlling circulating current iz flowing through the delta connection for balancing voltage values Vdccell of capacitors 7 among phases. Control device 3 combines voltage command values Vd* and Vq* generated by the output current control and zero-phase voltage command value Vz* generated by the circulating current control to generate arm voltage command values Vuv*, Vvw*, and Vwu*, and based on the generated arm voltage command values Vuv*, Vvw*, and Vwu*, capacitor voltage Vdccell of each cell 5, and arm currents iuv, ivw, and iwu, generates output voltage command value Vcell* for controlling output voltage Vcell of each cell 5. Switching devices Q1 to Q4 of each cell 5 are turned on and off in response to a gate signal, thereby generating output voltage Vcell according to output voltage command value Vcell* between output terminals 5a and 5b of each cell 5.

As described above, control device 3 has to control circulating current iz while controlling output currents iu, iv, and iw during operation of power conversion apparatus 200. In the steady state, output current control can cause representative value Vdc of voltage values of all capacitors 7 to follow DC voltage command value Vdc* without any deviation.

In the specification of the present application, the steady state refers to a state in which a system voltage is in the three-phase equilibrium state. The three-phase equilibrium state is a state in which phase voltages have an equal amplitude and are out of phase by 120 degrees. Since MMC 2 outputs a current orthogonal to the system voltage, when the system voltage is in the three-phase equilibrium state, output currents iu, iv, and iw are also in the three-phase equilibrium state. In this case, thus, capacitor voltages Vdccell among phases can be balanced by a current command value composed only of active current command value iq* generated by full voltage control unit 10 and reactive current command value id*, which is a command value of reactive current id by which power system 1 needs to be compensated for. Ideally, interphase balance control unit 20 does not operate, so that output current control and circulating current control do not interfere with each other.

Contrastingly, in power conversion apparatus 200, capacitor voltage Vdccell in each cell 5 changes in accordance with the active power transmitted and received between power system 1 and capacitor 7. For example, when capacitor 7 supplies power to driver 9 or capacitor 7 is discharged due to a power loss occurring in the bridge circuit in cell 5, power system 1 needs to supply active power to charge capacitor 7.

Alternatively, when the system voltage fluctuates, the reactive power to be output from MMC 2 to power system 1 changes. Thus, the output voltage of MMC 2 needs to be changed in accordance with the fluctuations of the system voltage. Capacitor 7 in each cell 5 is charged and discharged due to a delay of the output voltage of MMC 2 with respect to the system voltage.

The situation in which capacitors 7 in all cells 5 included in MMC 2 are charged and discharged can occur if power conversion apparatus 200 is in the transient fluctuation state. In the specification of the present application, the transient fluctuation state refers to a state in which the system voltage is in the three-phase disequilibrium state or the system voltage has changed suddenly.

The three-phase disequilibrium state refers to a state in which the phase voltages are out of phase not by 120 degrees. In this case, the current output from MMC 2 to power system 1 is also in the three-phase disequilibrium state. With the current command value composed only of active current command value iq* and reactive current command value id*, output currents iu, iv, and iw enter the three-phase disequilibrium state, and a condition on which the system voltage and output current are orthogonal to each other is not provided. Consequently, capacitor 7 is charged and discharged, resulting in an imbalance of capacitor voltage Vdccell among phases. Consequently, interphase balance control unit 20 operates and performs a control computation for eliminating the imbalance to generate circulating current command value iz* and negative-phase-sequence current command values idn* and iqn*, thereby eliminating the imbalance of capacitor voltage Vdccell among phases.

The state in which the system voltage has changed suddenly includes a state in which, due to a momentary voltage drop in power system 1, for example, the magnitude or phase of the system voltage has fluctuated irrespective of the presence or absence of the three-phase equilibrium state. For example, an example of the above state is a case in which in the three-phase equilibrium state, the magnitude of the system voltage has fluctuated from a rated voltage to 90% of the rated voltage. MMC 2 basically controls output voltage Vcell of each cell 5 in accordance with the system voltage. In other words, as the system voltage fluctuates, output voltage Vcell needs to be changed in accordance with the fluctuations. However, since a delay develops more or less in the control system, the output voltage cannot be changed instantaneously in accordance with the fluctuations of the system voltage. Thus, a delay always develops in the output voltage with respect to the system voltage, and capacitor 7 is charged and discharged during a period of such a delay. This may lead to a situation in which capacitor voltage Vdccell cannot follow voltage command value Vdc*. This causes a deviation between representative value Vdc of the voltage values of all capacitors 7 and DC voltage command value Vdc*. Similarly, the degree of the imbalance of the capacitor voltage Vdccell among phases may increase due to a delay of the control system.

As described above, output current control and circulating current control may interfere with each other to reduce control performance during transient fluctuations. This leads to a fear that the operation of MMC 2 may become unstable.

In power conversion apparatus 200 according to Embodiment 1, thus, a deviation to be compensated for by output current control is removed from circulating current control, thereby preventing interference between output current control and circulating current control during transient fluctuations. Specifically, output current control and circulating current control are caused not to interfere with each other by removing the control amount of representative value Vdc of the voltage values of all capacitors 7 through output current control from the computation for zero-phase voltage command value Vz* in circulating current control.

Configuration examples of the respective blocks of control device 3 shown in FIG. 4 will be described below with reference to FIGS. 5 to 11.

(Full Voltage Control Unit)

Figure 5:
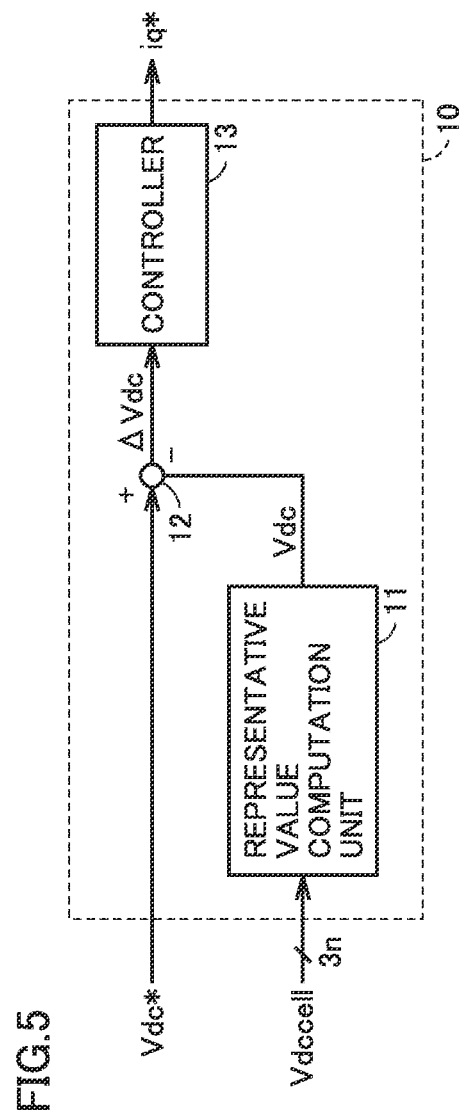
FIG. 5 shows a configuration example of a full voltage control unit shown in FIG. 4.

FIG. 5 shows a configuration example of full voltage control unit 10 shown in FIG. 4. With reference to FIG. 5, full voltage control unit 10 includes a representative value computation unit 11, a subtracter 12, and a controller 13.

Representative value computation unit 11 computes a representative value of capacitor voltages Vdccell of 3n capacitors 7 (hereinafter also referred to as "full voltage representative value Vdc") based on the values detected by voltage detectors 8 disposed in the respective cells 5. Full voltage representative value Vdc may be, for example, an average value, a maximum value, or a minimum value of 3n capacitor voltages Vdccell. Alternatively, values obtained by filtering computed values can be used in place of the above computed values.

Subtracter 12 obtains a deviation ΔVdc between DC voltage command value Vdc* and full voltage representative value Vdc.

Controller 13 performs a control computation for setting the computed deviation ΔVdc to zero, that is, for causing full voltage representative value Vdc to follow DC voltage command value Vdc*, thereby generating a positive-phase-sequence active current command value iq*. Controller 13 outputs the generated positive-phase-sequence active current command value iq* to output current control unit 60 (FIG. 4).

(Interphase Balance Control Unit)

Figure 6:
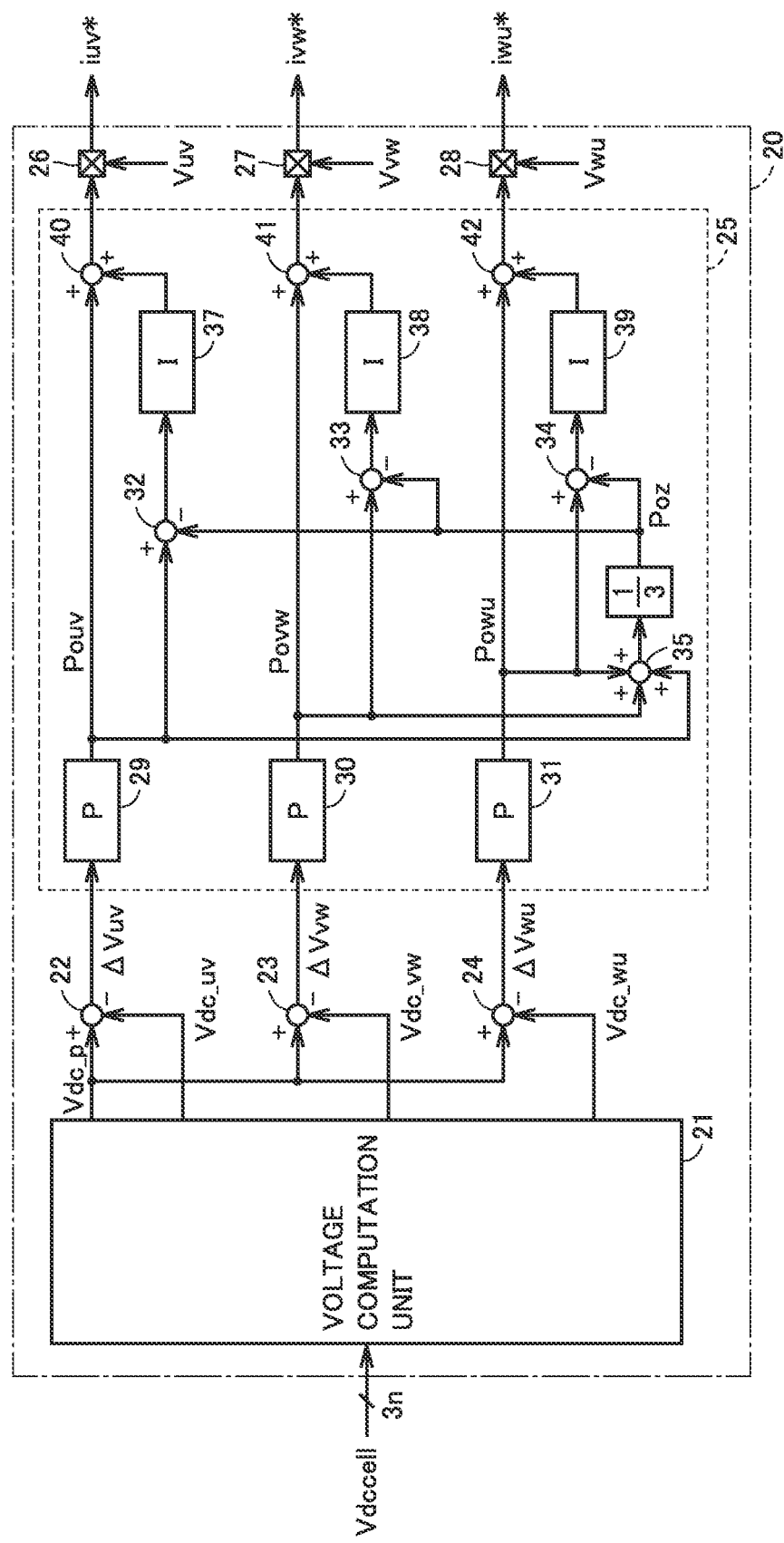
FIG. 6 shows a first configuration example of an interphase balance control unit shown in FIG. 4.

FIG. 6 shows a first configuration example of interphase balance control unit 20 shown in FIG. 4. With reference to FIG. 6, interphase balance control unit 20 includes a voltage computation unit 21, subtracters 22 to 24, a controller 25, and multipliers 26 to 28.

Voltage computation unit 21 computes a representative value (full voltage representative value) Vdc_p of capacitor voltages Vdccell of 3n capacitors 7 based on the values detected by voltage detectors 8 disposed in the respective cells 5.

For example, full voltage representative value Vdc_p may be an average value, a maximum value, or a minimum value of 3n capacitor voltages Vdccell. Alternatively, values obtained by filtering computed values or DC voltage command value Vdc* can be used in place of these computed values. A high-frequency component and a specific-frequency component included in input components of controller 25 can be removed by filtering the computed values, leading to more stable operation of controller 25. Full voltage representative value Vdc_p in interphase balance control unit 20 may be a value same as or different from full voltage representative value Vdc in full voltage control unit 10 (FIG. 5).

Further, voltage computation unit 21 computes a representative value (hereinafter also referred to as "UV-phase voltage representative value Vdc_uv") of capacitor voltages Vdccell of n capacitors 7 included in arm A1. Voltage computation unit 21 computes a representative value (hereinafter also referred to as "VW-phase voltage representative value Vdc_vw") of capacitor voltages Vdccell of n capacitors 7 included in arm A2. Voltage computation unit 21 computes a representative value (hereinafter also referred to as "WU-phase voltage representative value Vdc_wu") of capacitor voltages Vdccell of n capacitors 7 included in arm A3.

Each of phase voltage representative values Vdc_uv, Vdc_vw, and Vdc_wu may be an average value, a maximum value, or a minimum value of capacitor voltages Vdccell of n capacitors 7 included in each arm. Alternatively, values obtained by filtering computed values can be used in place of these computed values.

Subtracter 22 obtains a deviation $\Delta Vuv$ between full voltage representative value Vdc_p and UV-phase voltage representative value Vdc_uv. Subtracter 23 obtains a deviation $\Delta Vvw$ between full voltage representative value Vdc_p and VW-phase voltage representative value Vdc_vw. Subtracter 24 obtains a deviation $\Delta Vwu$ between full voltage representative value Vdc_p and WU-phase voltage representative value Vdc_wu.

Controller 25 corrects a current command value such that each of deviations $\Delta Vuv$, $\Delta Vvw$, and $\Delta Vwu$ attains to zero, that is, each of phase voltage representative values Vdc_uv, Vdc_vw, and Vdc_wu follows full voltage representative value Vdc_p.

In the correction of the current command value, only circulating current command value iz* may be corrected, only negative-phase-sequence current command values idn* and iqn* generated by negative-phase-sequence current command computation unit 50 may be corrected, or as shown in FIG. 4, both of circulating current command value iz* and negative-phase-sequence current command values idn* and iqn* may be corrected. In other words, a configuration is made in the example of FIG. 6 such that the imbalance of capacitor voltage Vdccell among phases is controlled by circulating current iz and negative-phase-sequence currents idn and iqn.

In the configuration in which the imbalance of capacitor voltages Vdecell among phases is controlled only by circulating current iz, if deviations $\Delta Vuv$, $\Delta Vvw$, and $\Delta Vwu$ increase due to the imbalance of system voltages Vu, Vv, and Vw, a large circulating current iz needs to be flowed to eliminate the imbalance, resulting in a larger current flowing through MMC 2. As described above, a current flowing through MMC 2 can be reduced in eliminating the imbalance by controlling the imbalance of capacitor voltages Vdccell among phases by circulating current iz and negative-phase-sequence current iz. The rated current of MMC 2 can thus be made smaller, leading to a smaller size of MMC 2.

Herein, active power needs to be controlled to charge and discharge capacitor 7 in each cell 5. Multiplier 26 thus multiplies an output of controller 25 and an arm voltage Vuv together to obtain an arm current command value iuv*. Multiplier 27 multiplies an output of controller 25 and an arm voltage Vvw together to obtain an arm current command value ivw*. Multiplier 28 multiplies an output of controller 25 and an arm voltage Vwu together to obtain an arm current command value iwu*. Interphase balance control unit 20 outputs arm current command values iuv*, ivw*, and iwu* to negative-phase-sequence current command computation unit 50 and circulating current control unit 80.

Arm voltages Vuv, Vvw, and Vwu may be detected directly by a voltage detector or may be estimated from system voltages Vu, Vv, and Vw and arm currents iuv, ivw, and iwu.

The configuration example of controller 25 shown in FIG. 6 will be described further. With reference to FIG. 6, controller 25 includes proportioners (P) 29 to 31, adders 35 and 40 to 42, subtracters 32 to 34, and integrators (I) 37 to 39. Proportioners 29 to 31 and integrators 37 to 39 are connected in series, respectively.

Proportioner 29 calculates an operation amount Pouv for proportional control of deviation $\Delta Vuv$ between full voltage representative value Vdc_p and UV-phase voltage representative value Vdc_uv. Operation amount Pouv calculated by proportioner 29 is input to subtracter 32 and adders 35 and 40.

Proportioner 30 calculates an operation amount Povw for proportional control of deviation $\Delta Vvw$ between full voltage representative value Vdc_p and VW-phase voltage representative value Vdc_vw. Operation amount Povw calculated by proportioner 30 is input to subtracter 33 and adders 35 and 41.

Proportioner 31 calculates an operation amount Powu for proportional control of deviation $\Delta Vwu$ between full voltage representative value Vdc_p and WU-phase voltage representative value Vdc_wu. Operation amount Powu calculated by proportioner 31 is input to subtracter 34 and adders 35 and 42.

Operation amounts Pouv, Povw, and Powu in proportional control are added together by adder 35, and a result of the addition is divided by three, thereby generating an operation amount Poz. The generated operation amount Poz corresponds to a zero-phase component which is a common component among the phases. This common component is a component included in common in phase voltage representative values Vdc_uv, Vdc_vw, and Vdc_wu and depends on deviation $\Delta Vdc$ between voltage command value Vdc* and full voltage representative value Vdc. The common component corresponds to a zero-phase component of deviations $\Delta Vuv$, $\Delta Vvw$, and $\Delta Vwu$.

Subtracter 32 subtracts operation amount Poz from operation amount Pouv and inputs a result of the subtraction (Pouv−Poz) to integrator 37. Integrator 37 calculates an operation amount Iouv for integral control of operation amount Pouv−Poz. Adder 40 adds operation amount Pouv and operation amount Iouv together and outputs a result of the addition Pouv+Iouv to multiplier 26.

Subtracter 33 subtracts operation amount Poz from operation amount Povw and inputs a result of the subtraction (Povw−Poz) to integrator 38. Integrator 38 calculates an operation amount Iovw for integral control of operation amount Povw−Poz. Adder 41 adds operation amount Povw and operation amount Iovw together and outputs a result of the addition Povw+Iovw to multiplier 27.

Subtracter 34 subtracts operation amount Poz from operation amount Powu and inputs a result of the subtraction (Powu−Poz) to integrator 39. Integrator 39 calculates an operation amount Iowu for integral control of operation amount Powu−Poz. Adder 40 adds operation amount Powu and operation amount Iowu together and outputs a result of the addition Powu+Iowu to multiplier 28.

Controller 25 of interphase balance control unit 20 is configured as shown in FIG. 6, thereby preventing interference between interphase balance control unit 20 and full voltage control unit 10 (FIG. 5). Consequently, also during transient fluctuations in which capacitors 7 of all cells 5 included in MMC 2 are charged and discharged, the imbalance in capacitor voltage Vdccell among phases can be reduced, resulting in a stable operation of MMC 2.

Specifically, the common component in each phase can be compensated for by full voltage control unit 10 in the steady state, while during transient fluctuations, deviation $\Delta Vdc$ of full voltage representative value Vdc with respect to voltage command value Vdc* remains, and deviation $\Delta Vdc$ is common component Poz among operation amounts Pouv, Povw, and Powu. Originally, when common component Poz that does not need to be compensated for by integrators 37 to 39 is input to integrators 37 to 39, operation amounts Poz are accumulated, resulting in a delay with respect to the original compensation for an amount of accumulation.

During transient fluctuations, operation amount Poz is compensated for by both of full voltage control unit 10 and interphase balance control unit 20, resulting in interference between full voltage control unit 10 and interphase balance control unit 20.

Further, when the imbalance of the capacitor voltage among phases increases due to a delay in control of interphase balance control unit 20, an overcurrent flows through MMC 2, so that power conversion apparatus 200 may be stopped for protection.

In Embodiment 1, zero-phase component Poz which is a common component is subtracted from inputs of integrators 37 to 39, thereby preventing interference between full voltage control unit 10 and interphase balance control unit 20. This reduces the causes of the delay in interphase balance control unit 20, thus reducing the imbalance of the capacitor voltage among phases. Consequently, a stable operation of MMC 2 is enabled also during transient fluctuations.

(Negative-Phase-Sequence Current Command Computation Unit)

Figure 7:
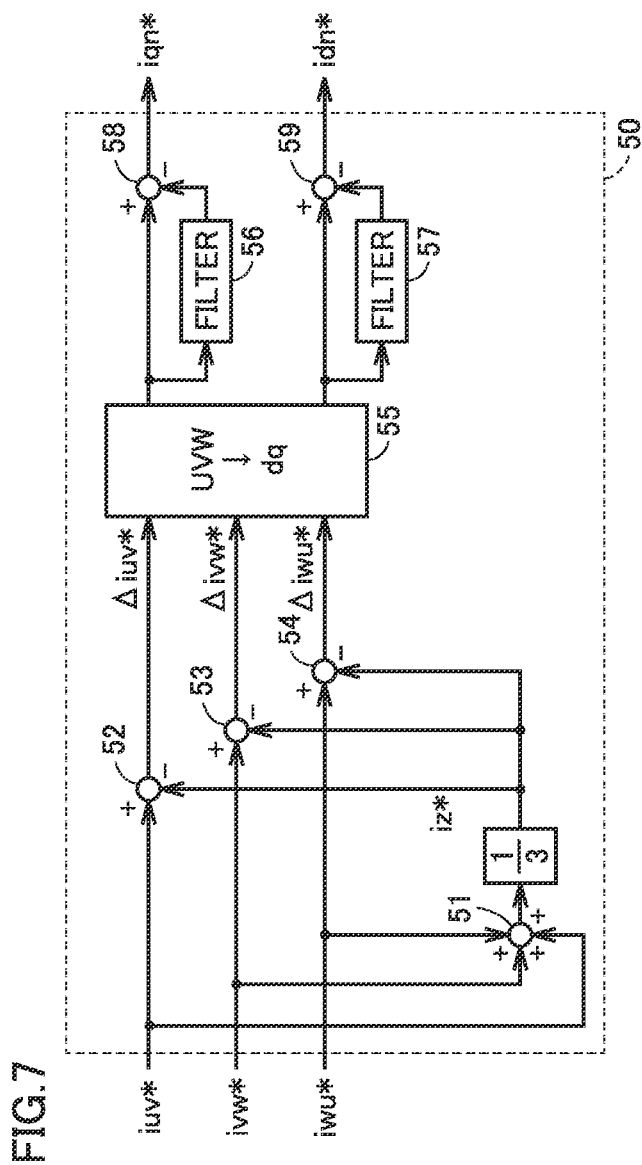
FIG. 7 shows a configuration example of a negative-phase-sequence current command computation unit shown in FIG. 4.

FIG. 7 shows a configuration example of negative-phase-sequence current command computation unit 50 shown in FIG. 4. Negative-phase-sequence current command computation unit 50 generates negative-phase-sequence current command values idn* and iqn* from arm current command values iuv*, ivw*, and iwu*. Negative-phase-sequence current command values idn* and iqn* are composed of negative-phase-sequence reactive current command value idn* and negative-phase-sequence active current command value iqn*.

With reference to FIG. 7, negative-phase-sequence current command computation unit 50 includes an adder 51, subtracters 52 to 54, 58, and 59, a coordinate transformation unit 55, and filters 56 and 57.

Adder 51 adds arm current command values iuv*, ivw*, and iwu* generated by interphase balance control unit 20 together. A result of the addition of adder 51 is divided by three, thereby generating circulating current command value iz*.

Subtracter 52 obtains a deviation Δiuv* between arm current command value iuv* and circulating current command value iz*. Subtracter 53 obtains a deviation Δivw* between arm current command value ivw* and circulating current command value iz*. Subtracter 54 obtains a deviation Δiwu* between arm current command value iwu* and circulating current command value iz*. In other words, subtracters 52 to 54 extract positive-phase-sequence components and negative-phase-sequence components of arm current command values iuv*, ivw*, and iwu*, respectively.

Coordinate transformation unit 55 performs three-phase to two-phase transformation on the extracted positive-phase-sequence components and negative-phase-sequence components (deviations Δiuv*, Δivw*, Δiwu*) by a positive-phase-sequence coordinate system.

Filters 56 and 57 extract a positive-phase-sequence component from the output of coordinate transformation unit 55. Specifically, filters 56 and 57 are each configured to remove a negative-phase-sequence component from a value input to a filter to extract a positive-phase-sequence component. In the positive-phase-sequence coordinate system, the positive-phase-sequence component is a DC component, and the negative-phase-sequence component is a double-frequency component ($2f$) of a fundamental wave frequency. Thus, notch filters such as first-order lag notch filters, $2f$ moving-average notch filters, or $2f$ notch filters are used as filters 56 and 57.

Subtracter 58 subtracts the output of filter 56 from the output of coordinate transformation unit 55, thereby generating negative-phase-sequence active current command value iqn*. Subtracter 59 subtracts the output of filter 57 from the output of coordinate transformation unit 55, thereby generating negative-phase-sequence reactive current command value idn*.

(Output Current Control Unit)

Figure 8:
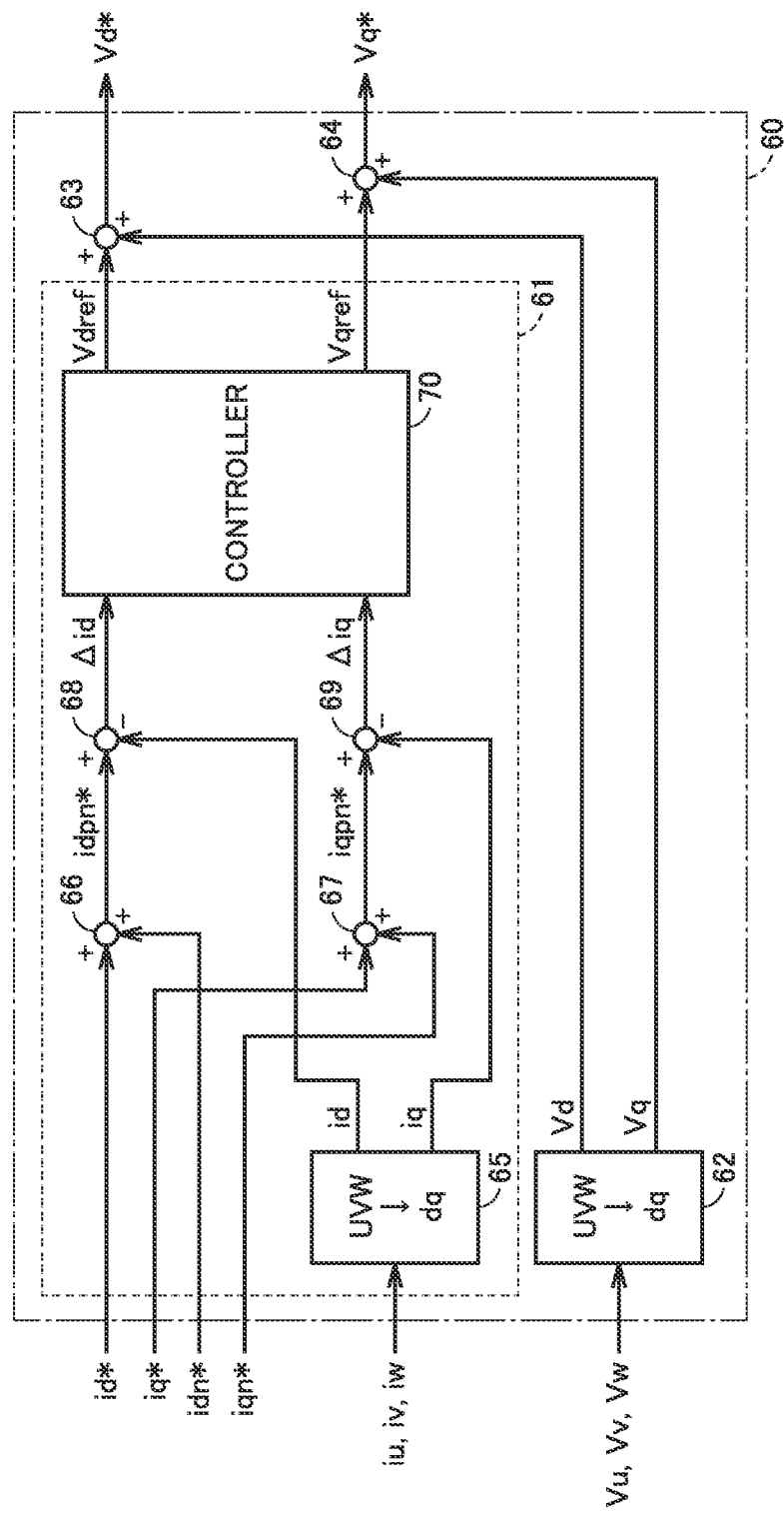
FIG. 8 shows a configuration example of an output current control unit shown in FIG. 4.

FIG. 8 shows a configuration example of output current control unit 60 shown in FIG. 4. Output current control unit 60 performs a control computation for causing reactive current id and active current iq obtained by dq transformation of output currents iu, iv, and iw of MMC 2 to follow output current command values idpn* and iqpn* generated by combining positive-phase-sequence current command values id* and iq* and negative-phase-sequence current command values idn* and iqn*, respectively, thereby generating voltage command values Vd* and Vq*.

With reference to FIG. 8, output current control unit 60 includes a reference voltage computation unit 61, a coordinate transformation unit 62, and adders 63 and 64.

Reference voltage computation unit 61 combines positive-phase-sequence current command values id* and iq* and negative-phase-sequence current command values idn* and iqn* to generate current command values idpn* and iqpn* for controlling output currents iu, iv, and iw. Reference voltage computation unit 61 performs a control computation for causing output currents iu, iv, and iw to follow current command values idpn* and iqpn* to generate reference voltages Vdref and Vqref.

Specifically, reference voltage computation unit 61 includes a coordinate transformation unit 65, adders 66 and 67, subtracters 68 and 69, and a controller 70. Coordinate transformation unit 65 performs three-phase to two-phase transformation on output currents iu, iv, and iw by a positive-phase-sequence coordinate system to compute positive-phase-sequence reactive current id and positive-phase-sequence active current iq.

Adder 66 adds positive-phase-sequence reactive current command value id* and negative-phase-sequence reactive current command value idn* together to generate current command value idpn*. Adder 67 adds positive-phase-sequence active current command value iq* and negative-phase-sequence active current command value iqn* to generate current command value iqpn*.

Subtracter 68 obtains a deviation Δid between current command value idpn* and positive-phase-sequence reactive current id. Subtracter 69 obtains a deviation Δiq between current command value iqpn* and positive-phase-sequence active current iq.

Controller 70 performs a control computation for setting each of deviations Δid and Δiq to zero, that is, causing positive-phase-sequence currents id and iq to follow current command values idpn* and iqpn*, respectively, to generate reference voltages Vdref and Vqref.

Coordinate transformation unit 62 performs three-phase to two-phase transformation on system voltages Vu, Vv, and Vw by a positive-phase-sequence coordinate system to compute positive-phase-sequence voltages Vd and Vq.

Output current control unit 60 generates voltage command values Vd* and Vq* as adders 58 and 59 add positive-phase-sequence voltages Vd and Vq to reference voltages Vdref and Vqref in a feedforward manner. Voltage command values Vd* and Vq* are composed of a reactive voltage command value Vd* and an active voltage command value Vq*.

(Circulating Current Control Unit)

Figure 9:
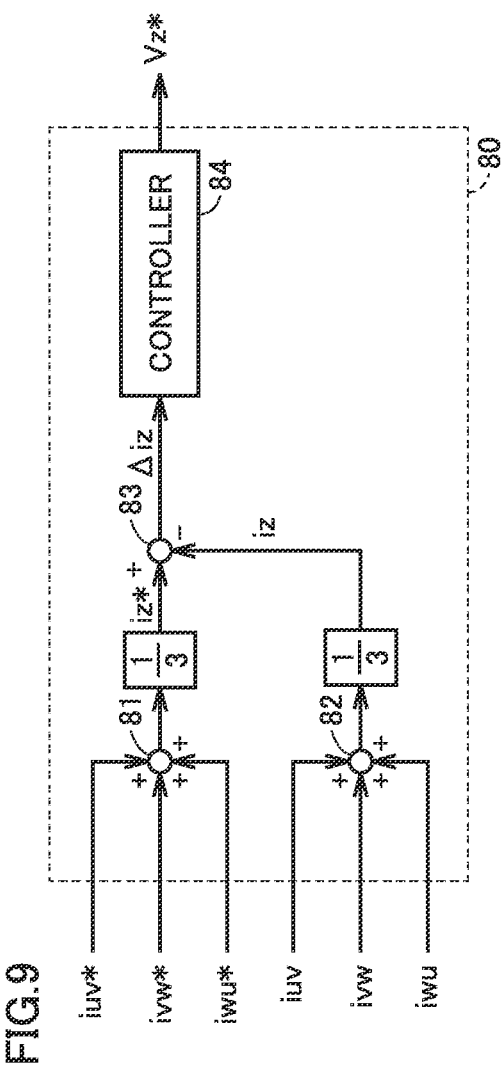
FIG. 9 shows a configuration example of a circulating current control unit shown in FIG. 4.

FIG. 9 shows a configuration example of circulating current control unit 80 shown in FIG. 4. Circulating current control unit 80 performs current control for balancing capacitor voltages Vdccell among phases of MMC 2.

With reference to FIG. 9, circulating current control unit 80 includes adders 81 and 82, a subtracter 83, and a controller 84.

Adder 81 adds arm current command values iuv*, ivw*, and iwu* generated by interphase balance control unit 20 (FIG. 6) together. A result of the addition by adder 81 is divided by three, thereby generating circulating current command value iz*.

Adder 82 adds arm currents iuv, iivw, and iwu detected by current detectors C1 to C3, respectively, together. A result of the addition by adder 82 is divided by three, thereby obtaining circulating current iz.

Subtracter 82 obtains a deviation Δiz between circulating current command value iz* and circulating current iz. Controller 84 performs a control computation for setting deviation Δiz to zero, that is, causing circulating current iz to follow circulating current command value iz* to generate a zero-phase voltage command value Vz*.

(Voltage Command Value Computation Unit)

Figure 10:
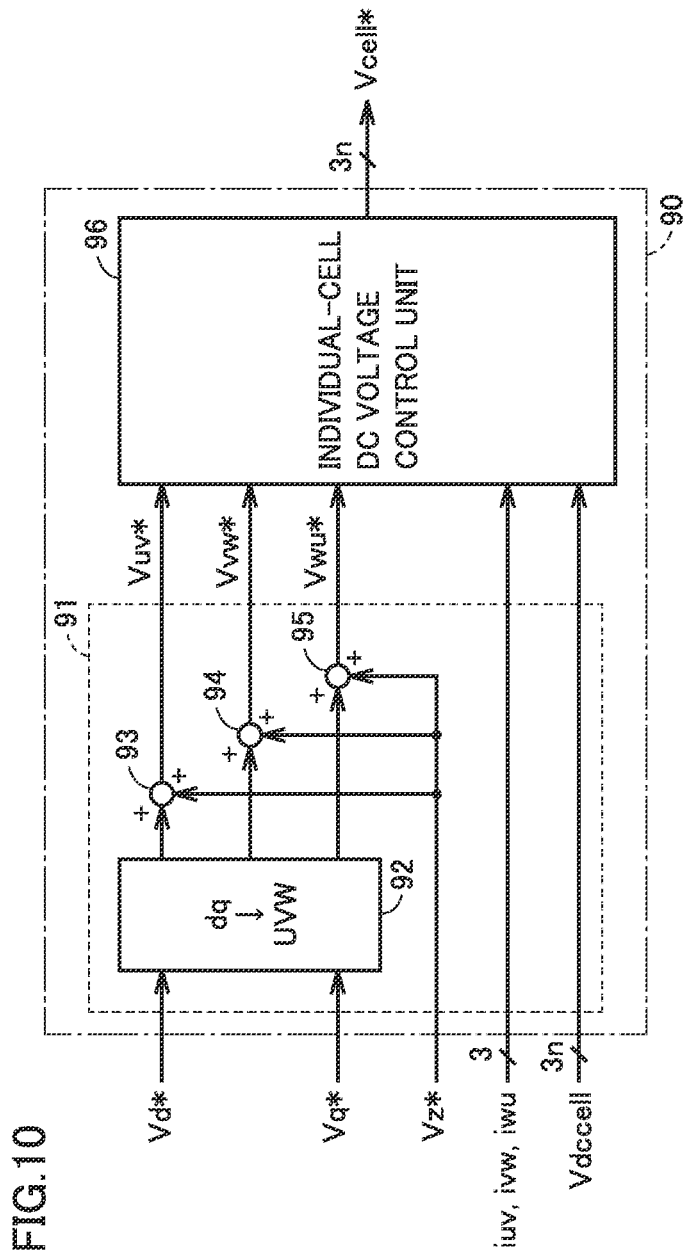
FIG. 10 shows a configuration example of a voltage command value computation unit shown in FIG. 4.

FIG. 10 shows a configuration example of voltage command value computation unit 90 shown in FIG. 4. Voltage command value computation unit 90 generates output voltage command value Vcell* for controlling output voltages Vcell of the respective cells 5 based on voltage command values Vd* and Vq* generated by output current control unit 60, zero-phase voltage command value Vz* generated by circulating current control unit 80, capacitor voltages Vdccell of the respective cells 5, and arm currents iuv, ivw, and iwu.

With reference to FIG. 10, voltage command value computation unit 90 includes an individual-phase voltage command value computation unit 91 and an individual-cell DC voltage control unit 96.

Individual-phase voltage command value computation unit 91 generates arm voltage command values Vuv*, Vvw*, and Vwu* based on voltage command values Vd* and Vq* and zero-phase voltage command value Vz*. Specifically, individual-phase voltage command value computation unit 91 includes a coordinate transformation unit 92 and adders 93 to 95.

Coordinate transformation unit 92 transforms voltage command values Vd* and Vq* to voltage command values of three phases by a positive-phase-sequence coordinate system. Adders 93 to 95 individually add zero-phase voltage command value Vz* to the transformed voltage command values of three phases to generate arm voltage command values Vuv*, Vvw*, and Vwu*.

Individual-cell DC voltage control unit 96 generates output voltage command values Vcell* of the respective cells 5 based on arm voltage command values Vuv*, Vvw*, and Vwu*, capacitor voltages Vdccell of the respective cells 5, and arm currents iuv, ivw, and iwu.

(Individual-Cell DC Voltage Control Unit)

Figure 11:
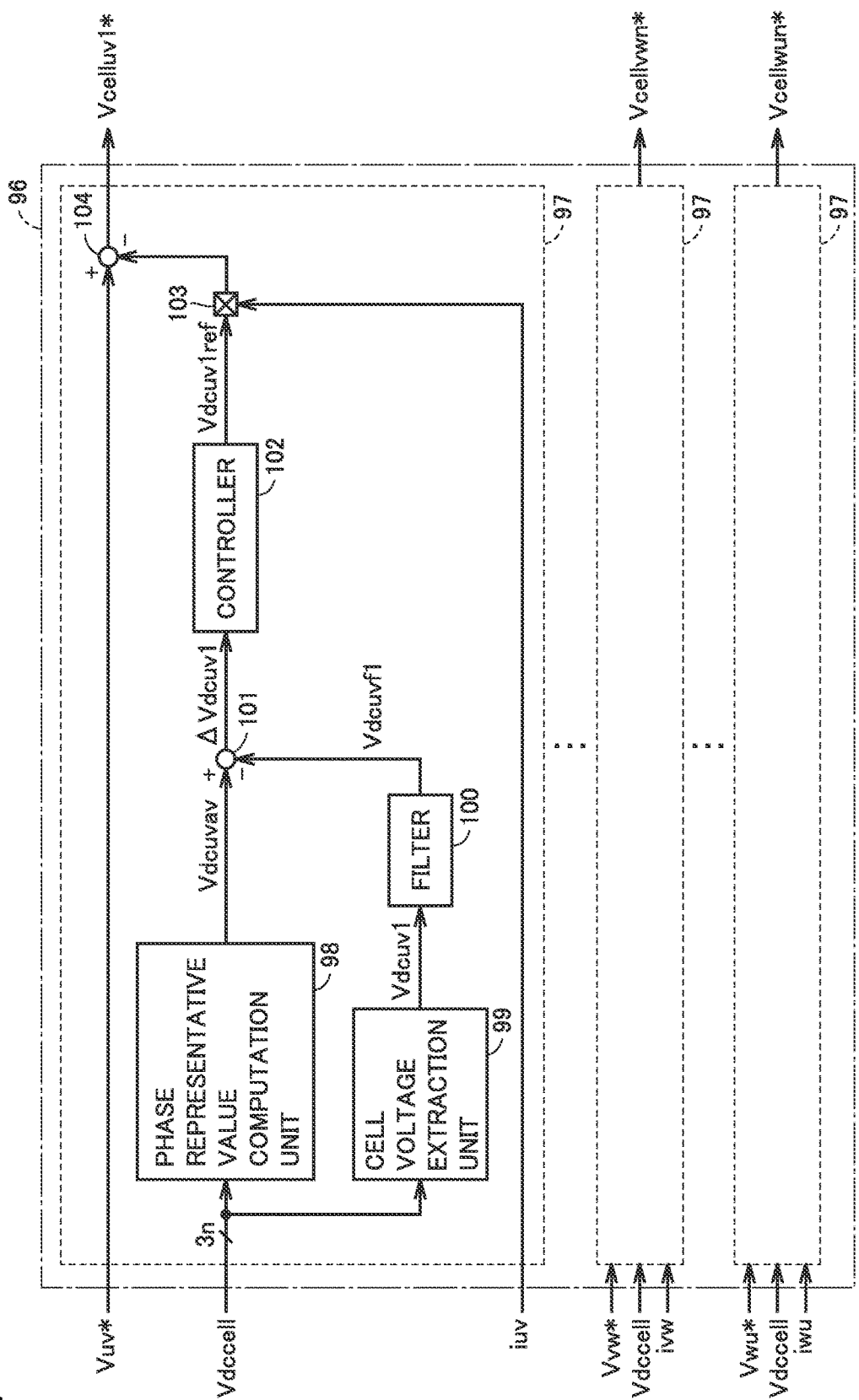
FIG. 11 shows a configuration example of an individual-cell DC voltage control unit shown in FIG. 10.

FIG. 11 shows a configuration example of individual-cell DC voltage control unit 96 shown in FIG. 10.

With reference to FIG. 11, individual-cell DC voltage control unit 96 includes 3n cell control units 97 corresponding to a total number of cells. Each of 3n cell control units 97 is configured to generate an output voltage command value Vcell* of a corresponding cell 5. Since 3n cell control units 97 have the same configuration, the configuration of a cell control unit 97 corresponding to cell 5 at the first stage of arm A1 will be described as a representative example.

Cell control unit 97 includes a phase representative value computation unit 98, a cell voltage extraction unit 99, a filter 100, subtracters 101 and 104, a controller 102, and a multiplier 103.

Phase representative value computation unit 98 computes a representative value (UV-phase voltage representative value Vdcuvav) of capacitor voltages Vdccell of n capacitors 7 included in the arm (arm A1) including a corresponding cell 5. UV-phase voltage representative value Vdcuvav can use any of an average value, a maximum value, and a minimum value of n capacitor voltages Vdccell included in arm A1.

Cell voltage extraction unit 99 extracts a capacitor voltage Vdccell of a corresponding cell 5 from 3n capacitor voltages Vdccell. In the example below, capacitor voltage Vdccell of cell 5 at the first stage of arm A1 is also referred to as "capacitor voltage Vdcuv1".

Filter 100 removes an AC component of frequency $2f$ from capacitor voltage Vdcuv1 extracted by cell voltage extraction unit 99 to compute Vdcuvf1. Subtracter 101 obtains a deviation ΔVdcuv1 between UV-phase voltage representative values Vdcuvav and Vdcuvf1.

Controller 102 performs a control computation for setting deviation ΔVdcuv1 to zero to compute an operation amount Vdcuv1ref. Multiplier 103 multiples operation amount Vdcuv1ref by arm current iuv in phase with the operation amount.

Subtracter 104 subtracts the output of multiplier 103 from arm voltage command value Vuv* in phase with the operation amount to generate an output voltage command value Vcelluv1*. Output voltage command value Vcelluv1* corresponds to an output voltage command value Vcell* with respect to cell 5 at the first stage of arm A1.

Individual-cell DC voltage control unit 96 generates n output voltage command values Vcelluv1* to Vcelluvn* each corresponding to a corresponding one of n cells 5 included in arm A1. Individual-cell DC voltage control unit 96 generates n output voltage command values Vcellvw1* to Vcellvwn* each corresponding to a corresponding one of n cells 5 included in arm A2. Individual-cell DC voltage control unit 96 generates n output voltage command values Vcellwu1* to Vcellwun* each corresponding to a corresponding one of n cells 5 included in arm A3. In this manner, 3n output voltage command values Vcell* are generated in one-to-one correspondence with 3n cells.

Gate signal generation unit 140 (FIG. 4) performs PWM control based on each of the three output voltage command values Vcell* generated by voltage command value computation unit 90 (individual-cell DC voltage control unit 96), thereby generating a gate signal for controlling on and off of switching devices Q1 to Q4 of each cell 5.

In control device 3 shown in FIG. 4, full voltage control unit 10 and output current control unit 60 constitute a "first control unit", and interphase balance control unit 20 and circulating current control unit 80 constitute a "second control unit". Voltage command value computation unit 90 corresponds to a "computation unit", and gate signal generation unit 140 corresponds to a "generation unit".

As described above, power conversion apparatus 200 according to Embodiment 1 can prevent interference between full voltage control unit 10 and interphase balance control unit 20 also during transient fluctuations, thus reducing the causes of the delay in interphase balance control unit 20. Thus, the imbalance of the capacitor voltages among phases can be reduced, enabling a stable operation of the MMC also during transient fluctuations.

Embodiment 2

Embodiments 2 to 5 will describe other configuration examples of interphase balance control unit 20 shown in FIG. 4. Since the configurations of the power conversion apparatuses according to Embodiments 2 to 5 are identical to the configuration of power conversion apparatus 200 according to Embodiment 1 except for the configuration of interphase balance control unit 20, detailed description will not be repeated.

Figure 12:
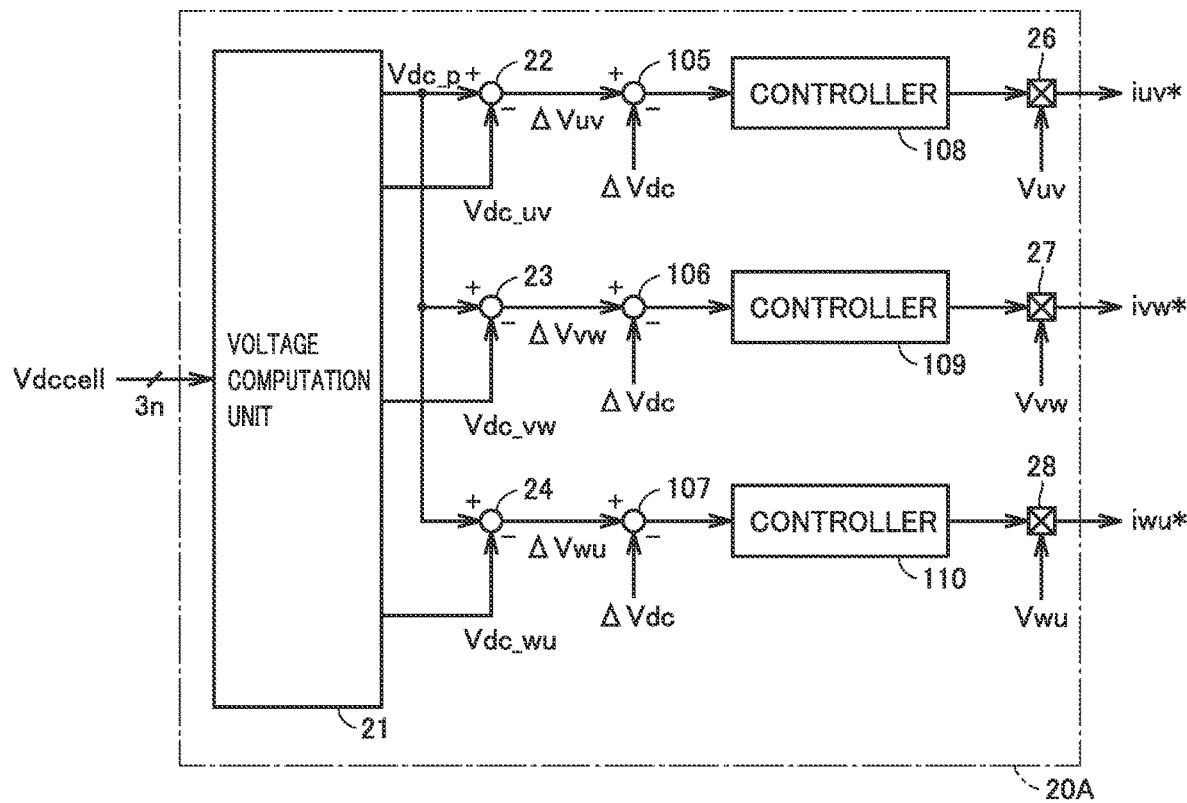
FIG. 12 shows a second configuration example of the interphase balance control unit shown in FIG. 4.

FIG. 12 shows a second configuration example of interphase balance control unit 20 shown in FIG. 4.

With reference to FIG. 12, an interphase balance control unit 20A according to the second configuration example includes voltage computation unit 21, subtracters 22 to 24 and 105 to 107, controllers 108 to 110, and multipliers 26 to 28.

Voltage computation unit 21 computes full voltage representative value Vdc_p based on a value detected by voltage detector 8 disposed in each cell 5. Voltage computation unit 21 further computes UV-phase voltage representative value Vdc_uv, VW-phase voltage representative value Vdc_vw, and WU-phase voltage representative value Vdc_wu.

Subtracter 22 obtains deviation $\Delta$Vuv between full voltage representative value Vdc_p and UV-phase voltage representative value Vdc_uv. Subtracter 23 obtains deviation $\Delta$Vvw between full voltage representative value Vdc_p and VW-phase voltage representative value Vdc_vw. Subtracter 24 obtains deviation $\Delta$Vwu between full voltage representative value Vdc_p and WU-phase voltage representative value Vdc_wu.

Subtracter 105 subtracts deviation $\Delta$Vdc between DC voltage command value Vdc* and full voltage representative value Vdc_p from deviation $\Delta$Vuv. Subtracter 106 subtracts deviation $\Delta$Vdc from deviation $\Delta$Vvw. Subtracter 107 subtracts deviation $\Delta$Vdc from deviation $\Delta$Vwu. Consequently, a zero-phase component, which is a common component among phases, is removed from each of deviations $\Delta$Vuv, $\Delta$Vvw, and $\Delta$Vwu.

Controller 108 performs a control computation for setting deviation $\Delta$Vuv–$\Delta$Vdc to zero. Controller 109 performs a control computation for setting deviation $\Delta$Vvw–$\Delta$Vdc to zero. Controller 110 performs a control computation for setting deviation $\Delta$Vwu–$\Delta$Vdc to zero.

Multiplier 26 multiplies the output of controller 108 and arm voltage Vuv together to obtain arm current command value iuv*. Multiplier 27 multiplies the output of controller 109 and arm voltage Vvw together to obtain arm current command value ivw*. Multiplier 28 multiplies the output of controller 110 and arm voltage Vwu together to obtain an arm current command value iwu*. Interphase balance control unit 20A outputs arm current command values iuv*, ivw*, and iwu* to negative-phase-sequence current command computation unit 50 and circulating current control unit 80 (FIG. 4).

As described above, the power conversion apparatus according to Embodiment 2 can achieve effects similar to those of the power conversion apparatus according to Embodiment 1 by removing deviation $\Delta$Vdc which is a zero-phase component from the inputs of controllers 108 to 110 in interphase balance control unit 20A.

Since the power conversion apparatus according to Embodiment 2 removes deviation $\Delta$Vdc from the inputs of controllers 108 to 110, it suffices that each of controllers 108 to 110 is composed of, for example, a proportioner and an integrator. Thus, the configuration of each controller is not particularly limited, leading to increased degree of freedom of the controller.

Embodiment 3

Figure 13:
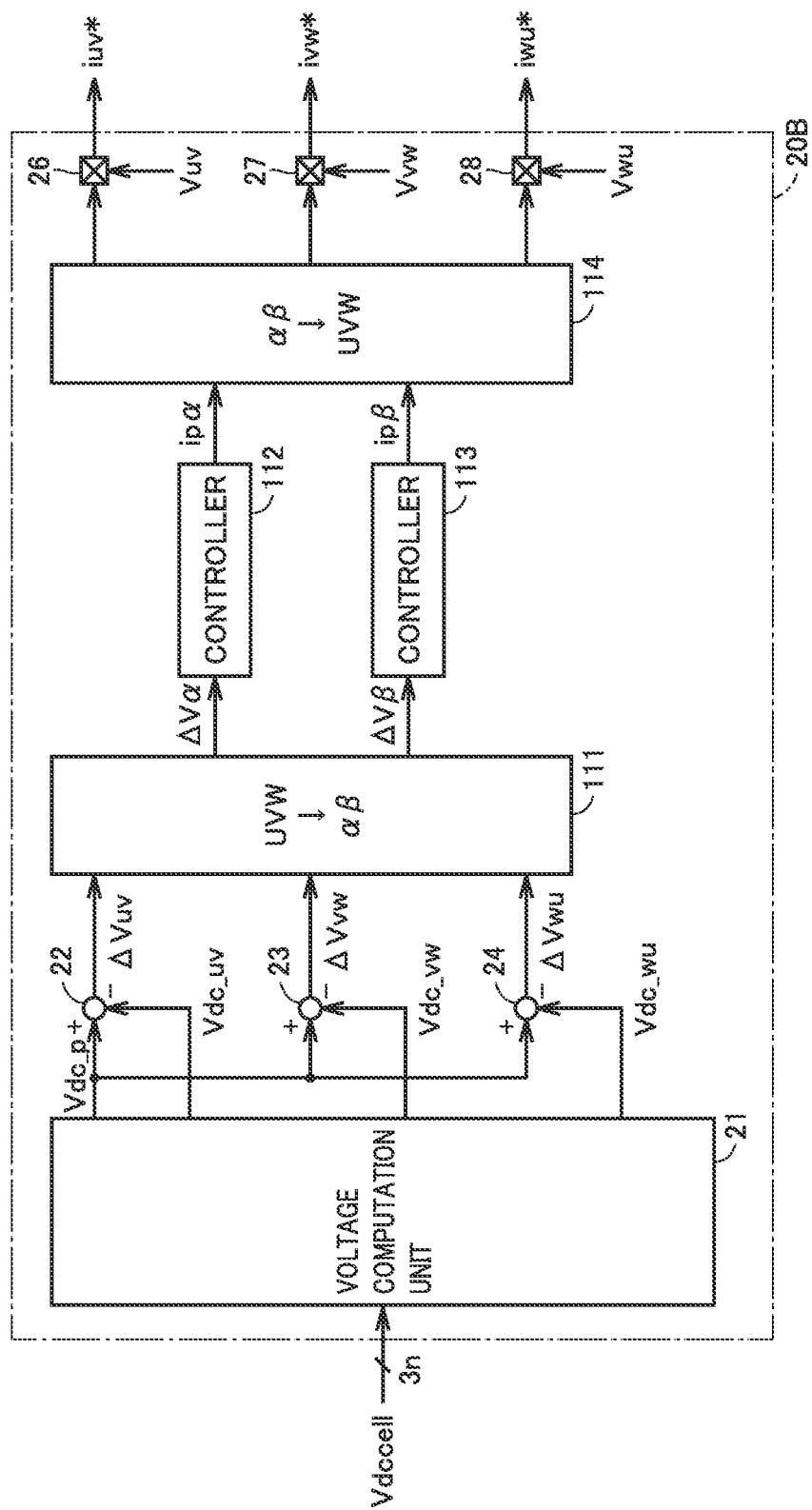
FIG. 13 shows a third configuration example of the interphase balance control unit shown in FIG. 4.

FIG. 13 shows a third configuration example of interphase balance control unit 20 shown in FIG. 4.

With reference to FIG. 13, an interphase balance control unit 20B according to the third configuration example includes a voltage computation unit 21, subtracters 22 to 24, coordinate transformation units 111 and 114, controllers 112 and 113, and multipliers 26 to 28.

Voltage computation unit 21 computes a full voltage representative value Vdc_p based on a value detected by voltage detector 8 disposed in each cell 5. Voltage computation unit 21 further computes UV-phase voltage representative value Vdc_uv, VW-phase voltage representative value Vdc_vw, and WU-phase voltage representative value Vdc_wu.

Subtracter 22 obtains deviation $\Delta$Vuv between full voltage representative value Vdc_p and UV-phase voltage representative value Vdc_uv. Subtracter 23 obtains deviation $\Delta$Vvw between full voltage representative value Vdc_p and VW-phase voltage representative value Vdc_vw. Subtracter 24 obtains deviation $\Delta$Vwu between full voltage representative value Vdc_p and WU-phase voltage representative value Vdc_wu.

Coordinate transformation unit 111 transforms deviations $\Delta$Vuv, $\Delta$Vvw, and $\Delta$Vwu to deviations $\Delta\alpha$ and $\Delta\beta$ by three-phase to $\alpha\beta$ transformation. Controller 112 performs a control computation for setting deviation $\Delta$V$\alpha$ to zero to generate a current command value ip$\alpha$. Controller 113 performs a control computation for setting deviation $\Delta$V$\beta$ to zero to generate a current command value ip$\beta$.

Coordinate transformation unit 114 transforms two-phase current command values ip$\alpha$ and ip$\beta$ to current command values of three phases by $\alpha\beta$ to three-phase transformation. Multipliers 26 to 28 multiply the current command values of three phases and arm voltages Vuv, Vvw, and Vwu together, respectively, to generate arm current command values iuv*, ivw*, and iwu*.

As described above, the power conversion apparatus according to Embodiment 3 can perform three-phase to $\alpha\beta$ transformation on deviations $\Delta$Vuv, $\Delta$Vvw, and $\Delta$Vwu to remove a zero-phase component. Controllers 112 and 113 are composed of two phases ($\alpha$ and $\beta$ phases) obtained by removing a zero-phase component, thereby removing a zero-phase component from the input of each controller. In other words, the power conversion apparatus according to Embodiment 3 performs three-phase to two-phase transformation and constitutes a controller by two phases, thereby achieving effects similar to those of the power conversion apparatus according to Embodiment 1.

Since the power conversion apparatus according to Embodiment 3 includes two controllers, this power conversion apparatus can include fewer controllers than the power conversion apparatus according to Embodiment 1, resulting in a reduced control computation amount.

Embodiment 4

Figure 14:
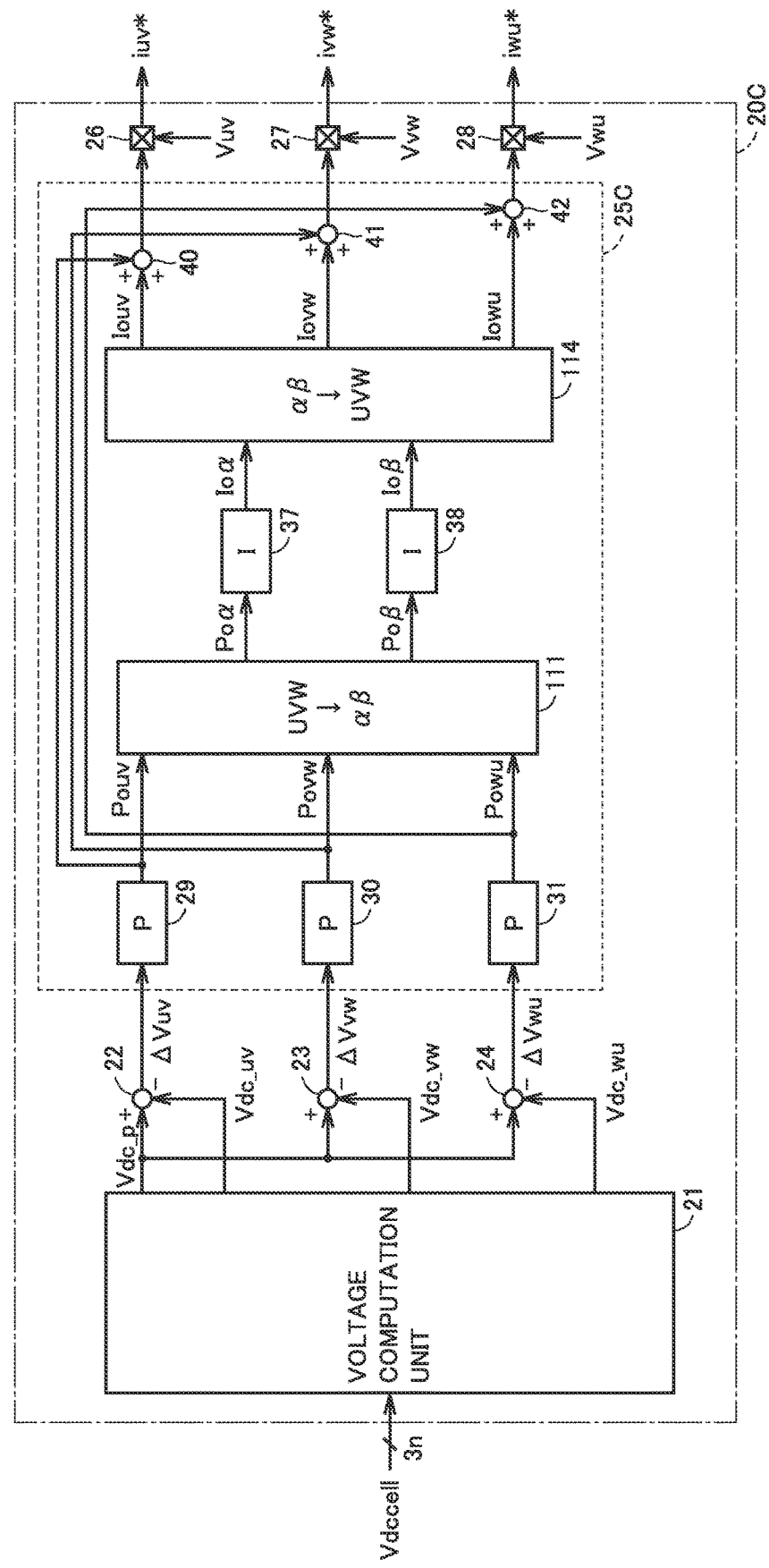
FIG. 14 shows a fourth configuration example of the interphase balance control unit shown in FIG. 4.

FIG. 14 shows a fourth configuration example of interphase balance control unit 20 shown in FIG. 4.

With reference to FIG. 14, an interphase balance control unit 20C according to the fourth configuration example includes a voltage computation unit 21, subtracters 22 to 24, a controller 25C, and multipliers 26 to 28.

Voltage computation unit 21 computes full voltage representative value Vdc_p based on a value detected by voltage detector 8 disposed in each cell 5. Voltage computation unit 21 further computes a UV-phase voltage representative value Vdc_uv, a VW-phase voltage representative value Vdc_vw, and a WU-phase voltage representative value Vdc_wu.

Subtracter 22 obtains deviation ΔVuv between full voltage representative value Vdc_p and UV-phase voltage representative value Vdc_uv. Subtracter 23 obtains deviation ΔVvw between full voltage representative value Vdc_p and VW-phase voltage representative value Vdc_vw. Subtracter 24 obtains deviation ΔVwu between full voltage representative value Vdc_p and WU-phase voltage representative value Vdc_wu.

Controller 25C corrects the current command value such that each of deviations ΔVuv, ΔVvw, and ΔVwu attains to zero, that is, each of phase voltage representative values Vdc_uv, Vdc_vw, and Vdc_wu follows full voltage representative value Vdc_p.

Specifically, controller 25C includes proportioners (P) 29 to 31, coordinate transformation units 111 and 114, integrators (I) 37 and 38, and adders 40 to 42. Proportioners 29 to 31 and integrators 37 and 38 are connected in series via coordinate transformation unit 111.

Proportioner 29 calculates operation amount Pouv for proportional control of deviation ΔVuv between full voltage representative value Vdc_p and UV-phase voltage representative value Vdc_uv. Operation amount Pouv calculated by proportioner 29 is input to coordinate transformation unit 111 and adder 40.

Proportioner 30 calculates operation amount Povw for proportional control of deviation ΔVvw between full voltage representative value Vdc_p and VW-phase voltage representative value Vdc_vw. Operation amount Povw calculated by proportioner 30 is input to coordinate transformation unit 111 and adder 41.

Proportioner 31 calculates operation amount Powu for proportional control of deviation ΔVwu between full voltage representative value Vdc_p and WU-phase voltage representative value Vdc_wu. Operation amount Powu calculated by proportioner 31 is input to coordinate transformation unit 111 and adder 42.

Coordinate transformation unit 111 transforms operation amounts Pouv, Povw, and Powu of three phases to operation amounts Poα and Poβ of two phases by three-phase to αβ transformation.

Integrator 37 calculates an operation amount Ioα for integral control of operation amount Poα. Integrator 38 calculates an operation amount Ioβ for integral control of operation amount Poβ. Coordinate transformation unit 114 transforms operation amounts Ioα and Ioβ of two phases to operation amounts Iouv, Iovw, and Iowu of three phases by αβ to three-phase transformation.

Adder 40 adds operation amount Pouv and operation amount Iouv together and outputs a result of the addition Pouv+Iouv to multiplier 26. Adder 41 adds operation amount Povw and operation amount Iovw together and outputs a result of the addition Povw+Iovw to multiplier 27. Adder 42 adds operation amount Powu and operation amount Iowu together and outputs a result of the addition Powu+Iowu to multiplier 28.

Multipliers 26 to 28 multiply operation amounts Pouv+Iouv, Povw+Iovw, and Powu+Iowu of three phases and arm voltages Vuv, Vvw, and Vwu together, respectively, to generate arm current command values iuv*, ivw*, and iwu*.

As described above, the power conversion apparatus according to Embodiment 4 includes controller 25C, in which only the integrator is composed of two phases, can remove a zero-phase component from the input of each integrator. Consequently, effects similar to those of the power conversion apparatus according to Embodiment 1 are achieved.

Further, since the power conversion apparatus according to Embodiment 4 includes two integrators in the controller, this power conversion apparatus can include fewer integrators than the power conversion apparatus according to Embodiment 1, resulting in a reduced control computation amount. Meanwhile, the proportioner is configured for each of three phases, resulting in an increased degree of freedom of the controller.

Embodiment 5

Figure 15:
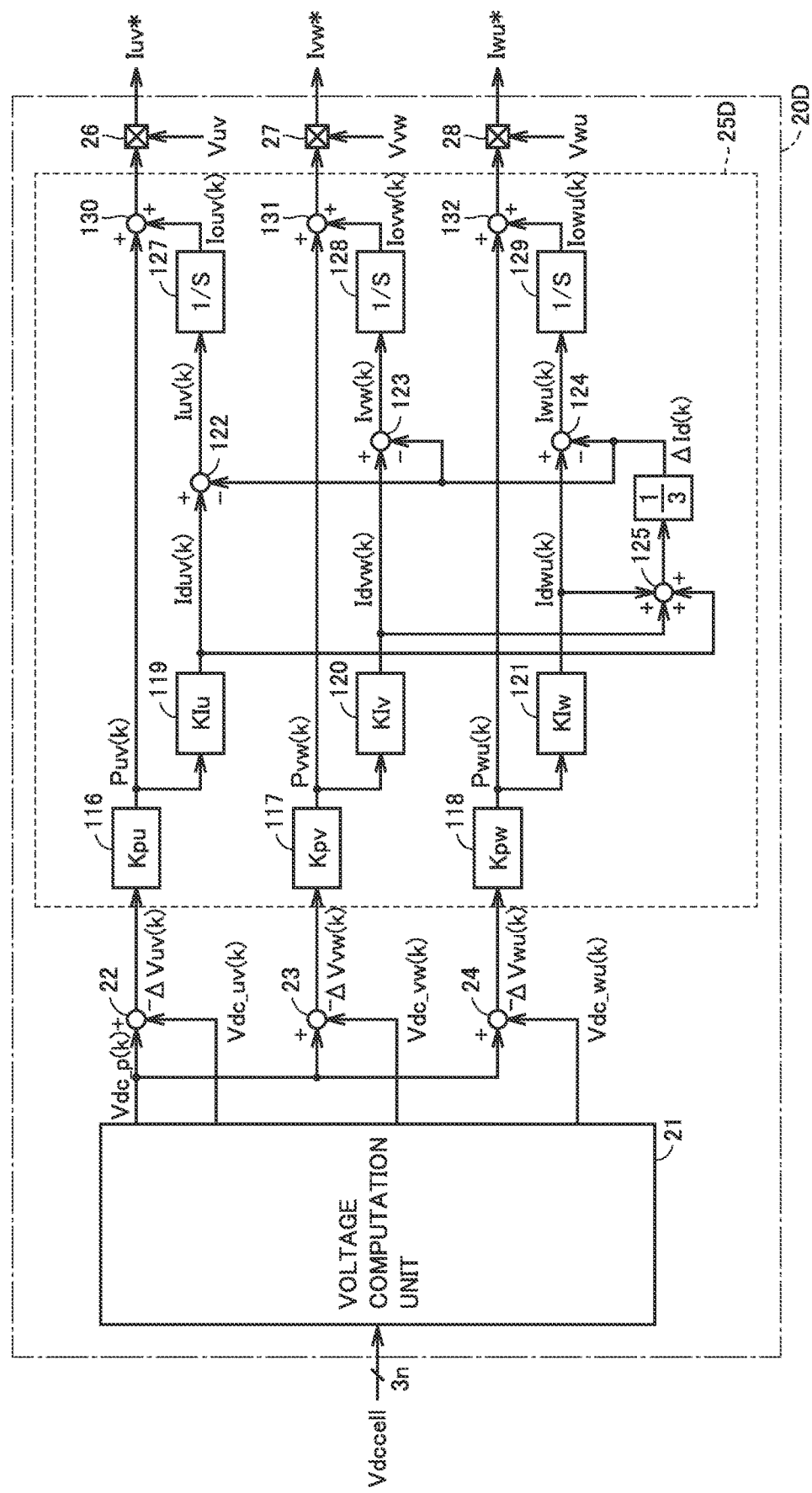
FIG. 15 shows a fifth configuration example of the interphase balance control unit shown in FIG. 4.

FIG. 15 shows a fifth configuration example of interphase balance control unit 20 shown in FIG. 4.

With reference to FIG. 15, an interphase balance control unit 20D according to the fifth configuration example is obtained by discretization (digitization relative to time) of interphase balance control unit 20 (FIG. 6) according to the first configuration example.

Also in interphase balance control unit 20D, deviations ΔVuv(k), ΔVvw(k), and ΔVwu(k) are input to a controller 25D as in interphase balance control unit 20. Deviations ΔVuv(k), ΔVvw(k), and ΔVwu(k) indicate deviations ΔVuv, ΔVvw, and ΔVwu at a time k.

Controller 25D includes proportioners (P) 116 to 118, an adder 125, subtracters 122 to 124, integrator gains 119 to 121, integrators (I) 127 to 129, and adders 130 to 132.

Proportioner 116 calculates an operation amount Pouv(k) for proportional control of deviation ΔVuv(k). Operation amount Pouv(k) calculated by proportioner 116 is input to integrator gain 119 and adder 130. Proportioner 117 calculates an operation amount Povw(k) for proportional control of deviation ΔVvw(k). Operation amount Povw(k) calculated by proportioner 117 is input to integrator gain 120 and adder 131. Proportioner 118 calculates an operation amount Powu(k) for proportional control of deviation ΔVuv(k). Operation amount Powu(k) calculated by proportioner 118 is input to integrator gain 121 and adder 132.

Outputs Iduv(k), Idvw(k), and Idwu(k) are represented by Equations (1) to (3) below, respectively, $$Iduv(k)=Iduv(k-1)+KIu \cdot Puv(k) \quad (1)$$

$$Idvw(k)=Idvw(k-1)+KIv \cdot Pvw(k) \quad (2)$$

$$Idwu(k)=Idwu(k-1)+KIw \cdot Pwu(k) \quad (3)$$

where KIu, KIv, and KIw are gains and Iduv(k), Idvw(k), and Idwu(k) are outputs of each of integrator gains 119, 120, and 121.

Adder 125 adds outputs Iduv(k), Idvw(k), and Idwu(k) together. A result of the addition is divided by three to calculate a zero-phase component ΔId(k). Zero-phase component ΔId(k) is represented by Equation (4).

$$\Delta Id(k)=\tfrac{1}{3}\{Iduv(k)+Idvw(k)+Idwu(k)\} \quad (4)$$

Subtracter 122 subtracts zero-phase component ΔId(k) from output Iduv(k) of integrator gain 119 and inputs a result of the subtraction ΔIuv(k) to integrator 127. Subtracter 123 subtracts zero-phase component ΔId(k) from output Idvw(k) of integrator gain 120 and inputs a result of the subtraction ΔIvw(k) to integrator 128. Subtracter 124 subtracts zero-phase component ΔId(k) from output Idwu(k) of integrator gain 121 and inputs a result of the subtraction ΔIwu(k) to integrator 129. In other words, inputs Iuv(k), Ivw(k), and Iwu(k) of integrators 127 to 129 are represented by Equations (5) to (7), respectively, $$Iuv(k)=Iduv(k)-\Delta Id(k) \quad (5)$$

$$Ivw(k)=Idvw(k)-\Delta Id(k) \quad (6)$$

$$Iwu(k)=Idwu(k)-\Delta Id(k) \quad (7)$$

Integrator 127 calculates an operation amount Iouv(k) for integral control of Iuv(k). Adder 130 adds operation amount Puv(k) and operation amount Iouv(k) together and outputs a result of the addition Puv(k)+Iouv(k) to multiplier 26.

Integrator 128 calculates an operation amount Iovw(k) for integral control of Ivw(k). Adder 131 adds operation amount Puv(k) and operation amount Iovw(k) together and outputs a result of the addition Pvw(k)+Iovw(k) to multiplier 27.

Integrator 129 calculates an operation amount Iowu(k) for integral control of Iwu(k). Adder 132 adds operation amount Pwu(k) and operation amount Iowu(k) together and outputs a result of the addition Pwu(k)+Iowu(k) to multiplier 28. Multipliers 26 to 28 multiply the outputs of adders 130 to 132 and arm voltages Vuv, Vvw, and Vwu together, respectively, to generate arm current command values iuv*, ivw*, and iwu*.

As described above, the power conversion apparatus according to Embodiment 5, in which interphase balance control unit 20 is configured of a discrete system, can perform control using digital processing. Also, the power conversion apparatus according to Embodiment 5 can also achieve effects similar to those of the power conversion apparatus according to Embodiment 1.

Further, the power conversion apparatus according to Embodiment 5 can individually set the gains of the proportioner and the integrator, and accordingly, has a higher degree of freedom of the controller than the power conversion apparatus according to Embodiment 1. Consequently, also when the UV phase, VW phase, and WU phase have a different number of cells, for example, an optimum gain can be set individually for the phases, leading to improved controllability.

It has been initially intended at the time of filing of the present application to appropriately combine the configurations described in Embodiments 1 to 5 described above, including any combination not mentioned in the specification, within a range free of inconsistency or contradiction.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1 power system, 1u, 1v, 1w power transmission line, 2 MMC, 3 control device, 4 transformer, 5 unit converter (cell), 5a, 5b output terminal, 6, 8 voltage detector, 7 capacitor, 9 driver, 10 full voltage control unit, 12, 21-24, 32-34, 52, 53, 54, 58, 59, 68, 69, 83, 101, 104-107, 122-124 subtracter, 13, 25, 25C, 25D, 70, 84, 102, 108-110, 112, 113 controller, 35, 40-42, 51, 63, 64, 66, 67, 81, 82, 93, 95, 125, 130-132 adder, 11 representative value computation unit, 20, 20A, 20B, 20C, 20D interphase balance control unit, 21 voltage computation unit, 26-28, 103 multiplier, 29-31, 116-118 proportioner, 37-39, 127-129 integrator, 50 negative-phase-sequence current command computation unit, 55, 62, 65, 92, 111, 114 coordinate transformation unit, 56, 57, 100 filter, 60 output current control unit, 61 reference voltage computation unit, 80 circulating current control unit, 90 voltage command value computation unit, 91 individual-phase voltage command value computation unit, 96 cell DC voltage control unit, 97 cell control unit, 99 cell voltage extraction unit, 119, 120, 121 integrator gain, 140 gate signal generation unit, 200 power conversion apparatus, A1-A3 arm, C1-C3, Cu, Cv, Cw current detector, D1-D4 diode, L1, L2, L3 reactor, Q1-Q4 switching device, UL, VL, WL AC line.

The invention claimed is:

1. A power conversion apparatus for interconnection with a three-phase AC power supply, the power conversion apparatus comprising:

a power converter having first to third arms connected by delta connection; and a control device configured to control the power converter, wherein each of the first to third arms includes one unit converter or a plurality of converters connected in series, the unit converter includes a power storage device connected between a pair of output terminals, and a plurality of switching devices configured to generate, between the pair of output terminals, an output pulse dependent on a voltage value of the power storage device, the control device includes a first control unit configured to generate a voltage command value for controlling a current flowing between the three-phase AC power supply and the power converter such that a full voltage representative value representing voltage values of all the power storage devices agrees with a DC voltage command value, a second control unit configured to generate a zero-phase voltage command value for controlling a circulating current flowing through the delta connection such that the voltage values of the power storage devices are balanced among the first to third arms, a computation unit configured to combine the voltage command value generated by the first control unit and the zero-phase voltage command value generated by the second control unit to generate an output voltage command value for controlling an output voltage of each of the unit converters, and a generation unit configured to generate a gate signal for controlling switching operations of the plurality of switching devices in accordance with the output voltage command value, and the control device is configured to remove a control amount of the full voltage representative value from a computation of the zero-phase voltage command value in the second control unit to cause the first control unit and the second control unit not to interfere with each other.

2. The power conversion apparatus according to claim 1, wherein during transient fluctuations in which each of the power storage devices is charged and discharged, the second control unit is configured to perform control of eliminating an imbalance in the voltage value of the power storage device between the first to third arms, independently of control of the full voltage representative value by the first control unit.

3. The power conversion apparatus according to claim 1, wherein
the second control unit is configured to
generate first to third arm current command values for controlling first to third arm currents flowing through the first to third arms, respectively, such that each of a first deviation between a first representative value representing the voltage values of the power storage devices in the first arm and the full voltage representative value, a second deviation between a second representative value representing the voltage values of the power storage devices in the second arm and the full voltage representative value, and a third deviation between a third representative value representing the voltage values of the power storage devices in the third arm and the full voltage representative value attains to zero, and
perform a control computation for causing the first to third arm currents to follow the first to third arm current command values, respectively, to generate the zero-phase voltage command value, and
the second control unit is configured to remove a common component included in common in the first to third representative values from each of the first to third deviations for generating the first to third arm current command values.

4. The power conversion apparatus according to claim 3, wherein the common component is a zero-phase component of the first to third deviations.

5. The power conversion apparatus according to claim 3, wherein the common component depends on a deviation between the voltage command value and the full voltage representative value.

6. The power conversion apparatus according to claim 3, wherein
the second control unit includes a controller configured to perform a control computation for setting each of the first to third deviations to zero to generate the first to third arm current command values, and
the first to third deviations are input to the controller with the common component removed.

7. The power conversion apparatus according to claim 3, wherein
the second control unit includes a controller configured to perform a control computation for setting each of the first to third deviations to zero to generate the first to third arm current command values,
the controller includes
a proportioner, and
an integrator connected in series with the proportioner, and
an output of the proportioner is provided to the integrator with the common component removed.

8. The power conversion apparatus according to claim 3, wherein the second control unit includes
a coordinate transformation unit configured to transform the first to third deviations to two-phase deviations by three-phase to $\alpha\beta$ transformation, and
a controller configured to perform a control computation for setting each of the two-phase deviations to zero.

9. The power conversion apparatus according to claim 3, wherein
the second control unit includes a controller configured to perform a control computation for setting each of the first to third deviations to zero to generate the first to third arm current command values, and
the controller includes
first to third proportioners configured to perform proportional control on the first to third deviations,
first and second integrators connected in series with the first to third proportioners, and
a coordinate transformation unit connected between the first to third proportioners and the first and second integrators and configured to perform three-phase to $\alpha\beta$ transformation on outputs of the first to third proportioners.

10. The power conversion apparatus according to claim 3, wherein the second control unit is configured of a discrete system.

* * * * *